(12) United States Patent
Walet et al.

(10) Patent No.: US 12,547,958 B2
(45) Date of Patent: Feb. 10, 2026

(54) SWAPPING TASK ASSIGNMENTS TO DETERMINE TASK SELECTION

(71) Applicant: Lineage Logistics, LLC, Irvine, CA (US)

(72) Inventors: Daniël Walet, Oakland, CA (US); Daniel Thomas Wintz, San Francisco, CA (US)

(73) Assignee: Lineage Logistics, LLC, Irvine, CA (US)

( * ) Notice: Subject to any disclaimer, the term of this patent is extended or adjusted under 35 U.S.C. 154(b) by 327 days.

(21) Appl. No.: 17/831,404

(22) Filed: Jun. 2, 2022

(65) Prior Publication Data

US 2022/0391813 A1 Dec. 8, 2022

Related U.S. Application Data

(60) Provisional application No. 63/196,156, filed on Jun. 2, 2021.

(51) Int. Cl.
| | |
|---|---|
| *G06Q 10/0631* | (2023.01) |
| *B66F 9/06* | (2006.01) |
| *G05D 1/00* | (2006.01) |
| *G06Q 10/087* | (2023.01) |

(52) U.S. Cl.
CPC ....... *G06Q 10/06316* (2013.01); *B66F 9/063* (2013.01); *G05D 1/0291* (2013.01); *G06Q 10/087* (2013.01)

(58) Field of Classification Search
CPC .......... G06Q 10/06316; G06Q 10/087; G06Q 10/06311; B66F 9/063; G05D 1/0291
USPC ....................................................... 705/7.26
See application file for complete search history.

(56) References Cited

U.S. PATENT DOCUMENTS

| | | | | |
|---|---|---|---|---|
| 2003/0028323 | A1* | 2/2003 | Zeitler | G05D 1/0282 |
| | | | | 701/408 |
| 2019/0066035 | A1* | 2/2019 | Hance | G06Q 10/087 |
| 2019/0310655 | A1* | 10/2019 | Voorhies | G05D 1/0287 |

OTHER PUBLICATIONS

International Search Report and Written Opinion in International Appln. No. PCT/US2022/032030, mailed on Sep. 27, 2022, 18 pages.
Vandenberghe et al., "Protecting a Sensitive Queue from Arrival Variability," 2018 IEEE International Conference on Industrial Engineering and Engineering Management, Dec. 16, 2018, 5 pages.

* cited by examiner

*Primary Examiner* — Francis Z. Santiago Merced
(74) *Attorney, Agent, or Firm* — Barnes & Thornburg LLP

(57) ABSTRACT

Described herein are systems and methods for ordering item-movement tasks in storage facilities. Item-movement tasks are distributed amongst queues of operators in a first state of the queues. A first value indicating utilization based on the operators performing the queues in the first state is determined. A first task from a first queue is swapped with a second task from a second queue, forming a second state of the queues, such that the first queue to be performed by a first operator includes the second task and the second queue to be performed by a second operator includes the first task. A second value indicating utilization based on the operators performing the queues having the second state is determined. Based on determining that utilization is greater when the queues have the first state, the first task is swapped with the second task to revert the queues to the first state.

20 Claims, 10 Drawing Sheets

SWAPPING TASK ASSIGNMENTS TO DETERMINE TASK SELECTION

CROSS-REFERENCE TO RELATED APPLICATIONS

This application claims priority to and the benefit of U.S. Provisional Patent Application No. 63/196,156, filed Jun. 2, 2021, the entire content of which is incorporated herein by reference.

TECHNICAL FIELD

This document describes devices, systems, and methods related to determining what tasks to assign to workers in a warehouse environment.

BACKGROUND

A warehouse or other storage facility can be used to store items. Items can be stored for different periods of time and under different storage conditions, which can be based on a vendor, customer, or other relevant user. Items can be stored until they are requested by a relevant user, such as a customer. While the items are being stored, they can also be moved around the warehouse to different storage locations.

Tasks can be assigned to different workers in the warehouse. Sometimes, determining which tasks to assign to which workers can take significant amounts of time. Since a state of the warehouse can also change by the minute, such assignments may not take into consideration the changes to the state of the warehouse. Thus, the workers may not complete their assigned tasks efficiently.

Moving the items around the warehouse can also require time and energy. Sometimes, a warehouse worker can be assigned tasks that are completed and started in different locations in the warehouse. The warehouse worker must therefore travel from a location of the completed task to a location of the new task that needs to be started. While traveling this distance, the warehouse worker can encounter holdups, such as traffic. Moreover, the warehouse worker can spend significant amounts of time traveling this distance instead of completing tasks, thereby reducing efficiency of the warehouse worker as well as overall warehouse efficiency.

Additionally, some warehouse workers may be designated to only complete inbound tasks or outbound tasks but not both. Such warehouse workers can therefore be assigned tasks that require them to complete inbound tasks, then return to where they started to complete new inbound tasks. Such task assignments can result in decreased efficiency since the warehouse workers can be spending significant amounts of time traveling between tasks rather than completing tasks.

SUMMARY

The document relates to determining optimal task selections in a warehouse environment. In particular, the document describes selecting and allocating optimal tasks to warehouse workers in a manner that can provide a greatest global efficiency across tasks and warehouse workers. Selection and allocation of optimal tasks can be a heuristic that balances computational load and efficiency with optimizing results. Thus, the disclosed technology can be used to select what next task can be provided to a warehouse worker. The disclosed technology can provide for choosing a next task from a set of tasks that are currently ready for execution. If a task cannot yet be executed because a pre-existing task is not yet completed, then that task may not be included in the set of tasks that are currently ready for execution. The disclosed technology therefore balances selection of a best possible task to complete next with minimizing waste of motion of warehouse workers, preventing congestion in the warehouse, and maintaining an on-time truck loading and unloading service level.

Each of multiple warehouse workers can be assigned a queue of tasks to complete. When the warehouse worker is ready to complete a new task, the disclosed technology can be used to determine whether a next task in the warehouse worker's queue is the best task to complete next. For example, the disclosed technology can determine whether the warehouse worker's time and energy will be efficiently utilized by moving from the worker's current task to the next task in the worker's queue. In some implementations, the worker can complete an inbound storage task and the disclosed technology can select an outbound task that begins closest to where the inbound storage task ends. As a result, the worker may spend little time moving between the inbound task and the outbound task, thereby improving the worker's efficiency.

To determine utilization efficiency, the disclosed technology can provide for swapping a task in the worker's queue with a task in another warehouse worker's queue of tasks. The disclosed technology can then determine a global efficiency metric based on whether efficiency improves for either of the warehouse workers if they are to complete their respective queues with the swapped tasks. Efficiency can be improved if either of the workers travels less distance either before or after a swapped task. Efficiency can also be improved if either of the workers travels in less time when performing their entire queue of tasks, with the tasks swapped. Efficiency can therefore be improved if, per worker, travel time/distance is reduced and/or aggregate travel time/distance for all workers is reduced. If efficiency improves, then the disclosed technology can send instructions to the warehouse workers in accordance with the revised queues of tasks. If efficiency does not improve, then the disclosed technology can revert the task assignments to the task assignments before the swap. The disclosed technology can continue to swap tasks between different worker queues and assess the global efficiency metric in order to determine optimal task selection.

The global efficiency metric can be based on how long a warehouse worker has to travel between tasks (e.g., without moving a storage item, such that the travel time is largely unproductive movement). The more time the warehouse worker has to spend traveling between tasks, the less efficient the warehouse worker in in completing the worker's queue of tasks. In some implementations, pick up or put away locations of a pallet for a task in the worker's queue can be swapped. For example, a put away location for the pallet can be swapped with a location that is closer to a current location of the warehouse worker. As a result, the global efficiency metric can improve since the warehouse worker may not be traveling a long time to complete the next task. In some implementations, the disclosed technology can swap a pallet in the worker's next task with a different pallet of a same type, wherein the different pallet can be closer to a current location of the warehouse worker or otherwise easier and faster to grab by the worker. As a result, the global efficiency metric can improve.

The techniques described herein can be used to select optimal tasks for a docking area, full pallet movements within the warehouse, and case picking. For example, the docking area can require tasks such as loading, unloading, and receiving pallets from trucks. Full pallet movements can include tasks that move a full pallet from one location in the warehouse to another location, such as putting away the full pallet, staging, and replenishment. The full pallet can be completely built and identified. The full pallet can be a built case pick pallet. Moreover, case picking can include tasks such as building a mixed pallet by picking cases. The disclosed technology can be used in each of these three categories of task selection in order to improve overall warehouse efficiency.

Although the disclosed inventive concepts include those defined in the attached claims, it should be understood that the inventive concepts can also be defined in accordance with the following embodiments.

Embodiment 1 is a computer-implemented method for ordering tasks to move items in a storage facility, the method comprising: identifying, by a computing system, a collection of item-movement tasks to perform in a storage facility, each item-movement task in the collection of item-movement tasks indicating movement of a respective item from a respective source location to a respective destination location; distributing, by the computing system, item-movement tasks in the collection of item-movement tasks among multiple queues of item-movement tasks corresponding to multiple moving machines, to form a first state of the multiple queues of item-movement tasks, such that each moving machine of the multiple moving machines has a respective queue of item-movement tasks to perform, including: a first moving machine of the multiple moving machines having a first queue of item-movement tasks from among the multiple queues of item-movement tasks, and a second moving machine of the multiple moving machines having a second queue of item-movement tasks from among the multiple queues of item-movement tasks; determining, by the computing system, a first value that indicates utilization of the multiple moving machines based on the multiple moving machines performing the multiple queues of item-movement tasks while the multiple queues of item-movement tasks have the first state; swapping, by the computing system, a first item-movement task from the first queue of item-movement tasks with a second item-movement task from the second queue of item-movement tasks, to form a second state of the multiple queues of item-movement tasks, such that: the first queue of item-movement tasks to be performed by the first moving machine no longer includes the first item-movement task and now includes the second item-movement task, and the second queue of item-movement tasks to be performed by the second moving machine no longer includes the second item-movement task and now includes the first item-movement task; determining, by the computing system, a second value that indicates utilization of the multiple moving machines based on the multiple moving machines performing the multiple queues of item-movement tasks while the multiple queues of item-movement tasks have the second state; determining, by the computing system based on comparison of the first value to the second value, that utilization of the multiple moving machines is greater when the multiple queues of item-movement tasks have the first state; and swapping, by the computing system based on determining that utilization of the multiple moving machines is greater when the multiple queues of item-movement tasks have the first state, the first item-movement task in the second queue of item-movement tasks with the second item-movement task in the first queue of item-movement tasks, to revert the multiple queues of item-movement tasks to the first state.

Embodiment 2 is the computer-implemented method of embodiment 1, wherein the computing system is configured to leave the multiple queues of item-movement tasks in the second state as a result of determining, based on comparison of the first value to the second value, that utilization of the multiple moving machines is greater when the multiple queues of item-movement tasks have the second state.

Embodiment 3 is the computer-implemented method of any one of embodiments 1 and 2, further comprising sending, by the computing system, first instructions to cause the first moving machine to perform a next-to-perform task from the first queue of item-movement tasks; and sending, by the computing system, second instructions to cause the second moving machine to perform a next-to-perform task from the second queue of item-movement tasks.

Embodiment 4 is the computer-implemented method of any one of embodiments 1 through 3, further comprising randomly selecting, by the computing system, the first item-movement task and the second item-movement task, for the swapping of the first item-movement task and the second item-movement task, among item-movement tasks in the multiple queues of item-movement tasks.

Embodiment 5 is the computer-implemented method of any one of embodiments 1 through 4, wherein each item-movement task in the collection of item-movement tasks indicates movement of a respective pallet from a respective source location to a respective destination location; and at least some of the multiple moving machines are lift trucks.

Embodiment 6 is the computer-implemented method of any one of embodiments 1 through 5, wherein distributing the item-movement tasks in the collection of item-movement tasks among the multiple queues of item-movement tasks includes randomly distributing item-movement tasks in the collection of item-movement tasks among the multiple queues of item-movement tasks.

Embodiment 7 is the computer-implemented method of any one of embodiments 1 through 6, wherein the first value that indicates utilization of the multiple moving machines indicates a first amount that the multiple moving machines are without an item to move during performance of the multiple queues of item-movement tasks while the multiple queues of item-movement tasks have the first state; and the second value that indicates utilization of the multiple moving machines indicates a second amount that the multiple moving machines are without an item to move during performance of the multiple queues of item-movement tasks while the multiple queues of item-movement tasks have the second state.

Embodiment 8 is the computer-implemented method of any one of embodiments 1 through 7, further comprising: determining, by the computing system, a third value that indicates utilization of the multiple moving machines based on the multiple moving machines performing the multiple queues of item-movement tasks while the multiple queues of item-movement tasks have a third state; modifying, by the computing system, a third item-movement task from the first queue of item-movement tasks while the multiple queues of item-movement tasks have the third state (i) from having an original destination location at which to place an item to be moved by the third-item-movement task (ii) to having an alternative destination location at which to place the item to be moved by the third item-movement task, to form a fourth state of the multiple queues of item-movement tasks; determining, by the computing system, a fourth value that indicates utilization of the multiple moving machines based on the multiple moving machines performing the multiple queues of item-movement tasks while the multiple queues of item-movement tasks have the fourth state; determining, by the computing system based on comparison of the third value to the fourth value, that utilization of the multiple moving machines is greater when the multiple queues of item-movement tasks have the third state; and modifying, by the computing system based on having determined that the utilization of the multiple moving machines is greater when the multiple queues of item-movement tasks have the third state, the third item-movement task to have the original destination location, to revert the multiple queues of item-movement tasks to the third state.

Embodiment 9 is the computer-implemented method of any one of embodiments 1 through 8, wherein the computing system is configured to leave the multiple queues of item-movement tasks in the fourth state as a result of determining, based on comparison of the third value to the fourth value, that utilization of the multiple moving machines is greater when the multiple queues of item-movement tasks have the fourth state.

Embodiment 10 is the computer-implemented method of any one of embodiments 1 through 9, further comprising: determining, by the computing system, a third value that indicates utilization of the multiple moving machines based on the multiple moving machines performing the multiple queues of item-movement tasks while the multiple queues of item-movement tasks have a third state; modifying, by the computing system, a third item-movement task from the first queue of item-movement tasks while the multiple queues of item-movement tasks have the third state (i) from selecting an original item from an original source location (ii) to selecting an alternative item from an alternative location to form a fourth state of the multiple queues of item-movement tasks, the alternative item being a same type of item as the original item; determining, by the computing system, a fourth value that indicates utilization of the multiple moving machines based on the multiple moving machines performing the multiple queues of item-movement tasks while the multiple queues of item-movement tasks have the fourth state; determining, by the computing system based on comparison of the third value to the fourth value, that utilization of the multiple moving machines is greater when the multiple queues of item-movement tasks have the third state; and modifying, by the computing system based on having determined that the utilization of the multiple moving machines is greater when the multiple queues of item-movement tasks have the third state, the third item-movement task to select the original item from the original source location, to revert the multiple queues of item-movement tasks to the third state.

Embodiment 11 is a computing system comprising one or more processors and one or more computer-readable devices including instructions that, when executed by the one or more processors, cause the computing system to perform the computer-implemented method of any one of embodiments 1 to 10.

The devices, system, and techniques described herein may provide one or more of the following advantages. For example, the disclosed technology can be used to reduce an amount of travel time or distance between tasks for warehouse workers. Typically, a warehouse worker may be assigned only inbound tasks or only outbound tasks but not both. For example, the warehouse worker may be assigned a queue of inbound tasks and another warehouse worker may be assigned a queue of outbound tasks. Using the disclosed technology, the warehouse worker can be assigned both inbound and outbound tasks in order to reduce an amount of time that the warehouse worker may spend traveling between tasks. As a result, the warehouse worker's efficiency can improve as well as overall warehouse efficiency. For example, the warehouse worker can complete an inbound task. The disclosed technology can select an outbound task to be completed next by the warehouse worker if completing the outbound task is likely to improve the worker's overall efficiency. The outbound task can be selected from another warehouse worker's queue of outbound tasks. In other words, the disclosed technology can provide for swapping a next inbound task on the warehouse worker's queue with an outbound task on another warehouse worker's queue. The swapped outbound task can start at a location that is close to a location where the warehouse worker completed the inbound task. Thus, the warehouse worker can travel a shorter distance and spend less time moving between the current location and the location of the outbound task. By reducing the travel distance and/or time for the warehouse worker, worker efficiency as well as warehouse efficiency can be improved.

As another example, the disclosed technology can provide for reducing or otherwise preventing congestion in the warehouse. By assigning a warehouse worker a next task that is closest to a current location of a completed task, the warehouse worker may not be required to travel great distances to start the next task. When traveling greater distances to a next task, on the other hand, the warehouse worker may be more likely to encounter traffic or other holdups in the warehouse, which can further reduce efficiency of the worker and the overall warehouse. The disclosed technology therefore provides for the warehouse worker to spend less time and distance traveling between tasks, which also can assist the warehouse worker in avoiding traffic in the warehouse. The warehouse worker can complete their task(s) faster and more efficiently, which can increase overall warehouse efficiency.

The disclosed technology can also provide for maintaining an on-time truck loading and unloading service level. The warehouse can be expected to complete tasks efficiently and timely such that truck loading and unloading tasks can remain on-time. Since the disclosed technology provides for reducing an amount of time spent moving between tasks, the warehouse workers can more efficiently and quickly complete their tasks. The more efficiently and quickly that tasks are completed, the greater likelihood that the warehouse can provide for on-time truck loading and unloading services. When trucks are loaded and unloaded on time, the warehouse as a whole, as well as customers and other relevant stakeholders, may continue to operate efficiently and/or without delays. More efficient performance of tasks can reduce physical movement of moving machines (e.g., lift trucks), therefore reducing energy usage and wear and tear of the moving machines.

As another example, the disclosed technology can be computationally efficient. Every time that a task swap is assessed using the disclosed technology, any dynamic changes that may have occurred to a state of the warehouse can be taken into consideration. Global efficiency of the swap can then be assessed relative to any current changes to the state of the warehouse. Thus, task selection based on the swap can be more accurate and relative to the current state of the warehouse rather than based on prior states of the warehouse. Overall warehouse efficiency can be improved.

The details of one or more implementations are set forth in the accompanying drawings and the description below.

Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document relates to determining optimal and efficient pick pallet build operations in a warehouse environment. The disclosed technology can provide for building pick pallets on an aisle basis. Less-than-full pallets generated per aisle can then be combined into mixed pallets. The disclosed technology can also provide for minimizing damage or crushing of items that are layered in the pick pallets. Moreover, the disclosed technology can minimize labor required to pick items to build the pallets while also minimizing pick-path lengths.

The disclosed technology can be applied to both manual and automated warehouses. In a manual warehouse, a call to determine a pick pallet build operation can be made at a point that a pick order request is received. This call can populate placeholder tasks in a task queue to allow for labor scheduling and other planning purposes needed to fulfill the pick order request in a timely fashion. Additional calls can be made before a first pick task is performed in order to determine the pick pallet build operation based on latest conditions in the warehouse. The manual pick operation call can return, for each pick pallet to build, (1) a set of SKUs on the pick pallet, (2) for each SKU on the pick pallet, a set of locations that can satisfy the pick (which can also satisfy a first-in-first-out order), (3) an order that items should be picked relative to others, and (4) a number of items that need to be picked of each SKU.

In an automated warehouse (e.g., where there is automatic layer picking and/or a manual pick-to-belt operation), a call to determine a pick pallet build operation can also be made at a point that a pick order request is received. However, in a manual pick operation, each build-order for a single pallet can be distinct from other build lines. In the automated pick operation, one or more layers that have a same or similar build order may be interchangeable while building the pallet. The one or more layers can also be interchangeable based on crushability of products on each of the one or more layers. For at least these reasons, output from the automated pick operation call can be different than output from the manual pick operation call. Such flexibility in the automated pick operation call can provide for opportunity to determine a best order in which to execute each layer picker task.

Figure 1:
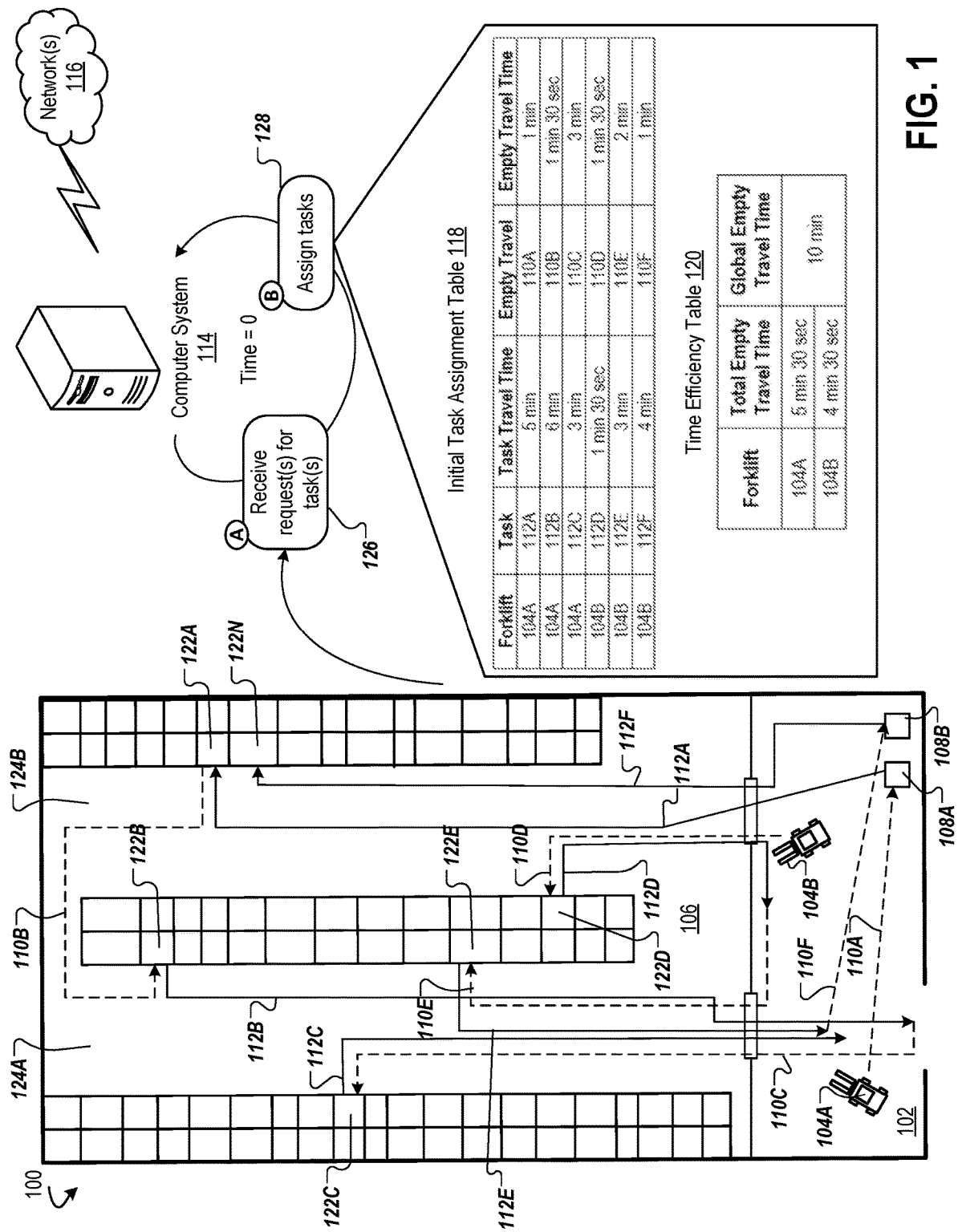
FIG. 1 is a conceptual diagram of a state of a warehouse environment at initial task assignment.

Now referring to the figures, FIG. 1 is a conceptual diagram of a state of a warehouse environment 100 at initial task assignment. The example warehouse environment 100 shows a current location of various vehicles, such as forklift 104A and 104B, as they move throughout the environment 100. The forklifts 104A-B can be operated by warehouse workers (e.g., operators). The forklifts 104A-B can be assigned tasks to complete in the warehouse environment 100. In some implementations, warehouse workers can also be assigned tasks to complete in the warehouse environment 100 that may or may not include using the forklifts 104A-B.

The warehouse environment 100 can also include various objects that can be moved throughout the environment 100, such as pallets 108A and 108B. The pallets 108A-B can be full pallets that are completely built. The pallets 108A-B can be stored at various locations in the warehouse environment 100. The pallets 108A-B can also be moved to different locations in the warehouse environment 100 while the pallets 108A-B are stored at the warehouse environment 100.

For example, the pallets 108A-B can be received in a docking area 102. The pallets 108A-B can be unloaded from a truck that arrived at the docking area 102. The pallets 108A-B can then be moved into storage in a storage area 106. The pallet 108A can be moved to storage location 122A in the storage area 106. The pallet 108B can be moved to storage location 122N in the storage area 106. The storage locations 122A-N can be bays, racks, or other types of areas for storing items such as the pallets 108A-B. The pallets 108A-B can remain in their respective storage locations 122A-N until the pallets 108A-B are requested by a customer. When requested by the customer, a warehouse worker, such as the forklift 104A can be instructed to pick up the pallets 108A-B and move them to the docking area 102, to be loaded onto an outbound truck. In some implementations, the pallets 108A-B can be moved to different storage locations or areas within the warehouse environment 100. As an illustrative example, the pallet 108A can be stored in the location 122A until the pallet 108A is needed to replenish a pick line bay. The pallet 108A can therefore be retrieved from the location 122A and moved to an area where the pick line bay is located.

The warehouse environment 100 can also include multiple storage areas 106. For example, one or more storage areas can be designated for cold storage. One or more storage areas can be other types of storage rooms or enclosed areas. The example warehouse environment 100 of FIG. 1 includes one storage area 106 having aisles 124A and 124B. Each of the aisles 124A and 124B can be lined with multiple racks, bays, or other storage locations 122A-N. Items such as the pallets 108A-B can be put away and/or picked up from the storage locations 122A-N in the aisles 124A-B.

In order to determine optimal task selection and assignment for the forklifts 104A-B, the forklifts 104A-B can communicate with a computer system 114 via network(s) 116 (e.g., wired and/or wireless communication). The computer system 114 can be configured to determine optimal task selection and assignment for each of the forklifts 104A-B or other warehouse workers, as described herein. In some implementations, the computer system 114 can be part of a warehouse management system (WMS) and/or in communication with the WMS.

At time=0, the computer system 114 can make initial task assignments to the forklifts 104A-B. For example, the computer system 114 can receive requests for tasks from the forklifts 104A-B (step A, 126). In some implementations, the computer system 114 can receive a request for a task from one of the forklifts 104A-B but not both. For example, the forklift 104A can complete a current task and therefore request a new task while the forklift 104B can be still working on a current task and therefore not ready to accept a new task. The forklifts 104A-B can send requests for new tasks when they are available to execute next tasks. For example, the forklifts 104A-B can finish full pallet movement and/or switch task groups.

The computer system 114 can then assign tasks to the forklifts 104A-B (step B, 128). Typically, the warehouse environment 100 can have 0-500 tasks to be performed at any given time. Moreover, the warehouse environment 100 can have between 1-40 warehouse workers, such as the forklifts 104A-B, that can perform the tasks. Optimizing task assignment can therefore be beneficial to improve overall warehouse efficiency in completing the tasks on-time. The tasks can be associated with full pallet moves. Such tasks can include putting away a pallet (e.g., inbound task), staging a pallet (e.g., outbound task), replenishment, reverse replenishment, and relocation. Putting away the pallet can include moving the pallet from a docking area to a storage location. Staging the pallet can include moving the pallet from the storage location to a dock lane, which can be for pre-work or for an active outbound truck. Replenishment can include moving the pallet from the storage location to a pick line location. Reverse replenishment can include moving the pallet from the pick line back to a storage location. Relocation can include moving the pallet from one storage location to another storage location.

The initial task assignments can be represented by initial task assignment table 118 depicted in FIG. 1. The table 118 can indicate a task, a projected task travel time, a projected empty travel route, and a projected empty travel time per task that is assigned to each of the forklifts 104A-B. The tasks 112A-F can be ready to be performed. In other words, the table 118 can only indicate task assignments that are ready to be performed, not tasks that are about to be ready to be performed. This is advantageous to ensure that task assignments are based on a current state of the warehouse environment.

As depicted and described further below, each of the forklifts 104A-B can be assigned both inbound and outbound tasks. Assigning both types of tasks to each of the forklifts 104A-B can be advantageous because an end location of an inbound task can be close to a start location of an outbound task. As a result, each of the forklifts 104A-B can have less empty travel time between the inbound and outbound task, thereby improving forklift efficiency as well as overall warehouse efficiency.

Assigning the tasks can also include determining, by the computer system 114, efficiency metrics for each of the forklifts 104A-B. Thus, the computer system 114 can generate a time efficiency table 120. The table 120 can indicate a total amount of empty travel time per forklift and a global empty travel time metric for the warehouse environment 100. The table 120 can be generated on the assumption that the forklifts 104A-B complete all of the initial tasks that they are assigned in the table 118.

As depicted in FIG. 1, the forklift 104A is assigned tasks 112A, 112B, and 112C. The computer system 114 estimates that it can take 5 minutes to complete task 112A (represented by a solid line in the warehouse environment 100), but before the forklift 104A can complete the task 112A, the forklift 104A is projected to spend 1 minute of empty travel time along empty travel route 110A (represented by a dashed line in the warehouse environment 100). Task 112A is an inbound task that requires the forklift 104A to move the pallet 108A from the docking area 102 to the storage location 122A in aisle 124B of the storage area 106. The forklift 104A is projected to take 1 minute to move from its current location in the docking area 102 to a current location of the pallet 108A in the docking area 102. This is the empty travel time, which is assessed by the computer system 114 to determine efficiency of the forklift 104A as well as overall warehouse efficiency. Once at the current location of the pallet 108A, the computer system 114 projects that it will take the forklift 104A 5 minutes to complete moving the pallet 108A to the storage location 122A in the task 112A.

Next, the forklift 104A has been assigned the outbound task 112B. The computer system 114 estimates that it can take the forklift 104A 6 minutes to complete the task 112B, but before the forklift 104A can complete the task 112B, the forklift 104A is projected to spend 1 minute and 30 seconds of empty travel time along empty travel route 110B. In other words, the computer system 114 estimates that it will take the forklift 104A 1 minute and 30 seconds to move along the empty travel route 110B from the storage location 122A (the end location of the task 112A) to a start location 122B of the task 112B. Once at the location 122B, the computer system 114 projects that it will take the forklift 104A 6 minutes to move an item from the location 122B to the docking area 102 in order to complete the task 112B.

Next, the forklift 104A has been assigned the outbound task 112C. The computer system 114 estimates that it can take the forklift 104A 3 minutes to complete the task 112C, but before the forklift 104A can complete the task 112C, the forklift 104A is projected to spend 3 minutes of empty travel time along empty travel route 110C. In other words, the computer system 114 estimates that it will take the forklift 104A 3 minutes to move along the empty travel route 110C from the docking area 102 (the end location of the task 112B) to a start location 122C of the task 112C. Once at the location 122C, the computer system 114 projects that it will take the forklift 104A 3 minutes to move an item from the location 122C back to the docking area 102 in order to complete the task 112C.

Similarly, the forklift 104B is assigned a set of tasks: 112D, 112E, and 112F. The forklift 104B has been assigned the outbound task 112D. The computer system 114 estimates that it can take the forklift 104B 1 minute and 30 seconds to complete the task 112D, but before the forklift 104B can complete the task 112D, the forklift 104B is projected to spend 1 minute and 30 seconds of empty travel time along empty travel route 110D. In other words, the computer system 114 estimates that it will take the forklift 104B 1 minute and 30 seconds to move along the empty travel route 110D from the docking area 102 (a current location of the forklift 104B) to a start location 122D of the task 112D. Once at the location 122D, the computer system 114 projects that it will take the forklift 104B 1 minute and 30 seconds to move an item from the location 122D back to the docking area 102 in order to complete the task 112D.

Next, the forklift 104B has been assigned another outbound task 112E. The computer system 114 estimates that it can take the forklift 104B 3 minutes to complete the task 112E, but before the forklift 104B can complete the task 112E, the forklift 104B is projected to spend 2 minutes of empty travel time along empty travel route 110E. In other words, the computer system 114 estimates that it will take the forklift 104B 2 minutes to move along the empty travel route 110E from the docking area 102 (the end location of the task 112D) to a start location 122E of the task 112E. Once at the location 122E, the computer system 114 projects that it will take the forklift 104B 3 minutes to move an item from the location 122E back to the docking area 102 in order to complete the task 112E.

Finally, the forklift 104B has been assigned inbound task 112F. The computer system 114 estimates that it can take the forklift 104B 4 minutes to complete the task 112F, but before the forklift 104B can complete the task 112F, the forklift 104B is projected to spend 1 minute of empty travel time along empty travel route 110F. In other words, the computer system 114 estimates that it will take the forklift 104B 1 minute to move along the empty travel route 110F from the docking area 102 (the end location of the task 112E) to a current location of the pallet 108B in the docking area 102. Once at the current location of the pallet 108B, the computer system 114 projects that it will take the forklift 104B 4 minutes to move the pallet 108B to the storage location 122N in order to complete the task 112F.

The time efficiency table 120, as described above, indicates the total empty travel time of each of the forklifts 104A-B. Thus, if the forklift 104A completes the tasks 112A-C in the order designated by the initial task assignment table 118, the forklift 104A is projected to have 5 minutes and 30 seconds of empty travel time. This time is a measure of the forklift 104A's inefficiency. If the forklift 104B completes the tasks 112D-F in the order designated by the table 118, then the forklift 104B is projected to have 4 minutes and 30 seconds of empty travel time. This is also a measure of the forklift 104B's inefficiency. Finally, the global empty travel time for the warehouse environment 100 is projected to be 10 minutes, which is a combination of the empty travel time of the forklift 104A and the empty travel time of the forklift 104B. The global empty travel time is a measure of the overall warehouse environment 100's inefficiency.

Figure 2:
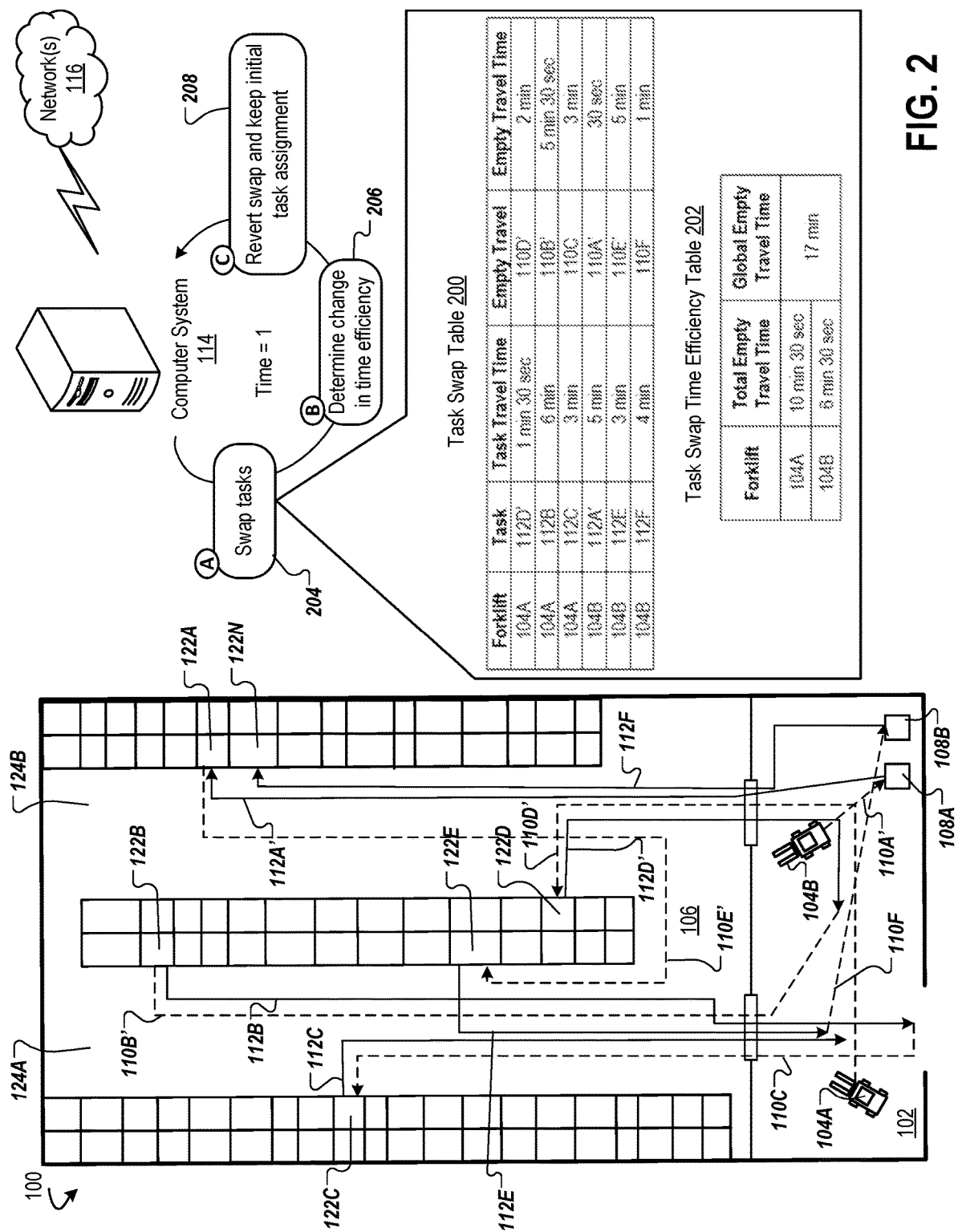
FIG. 2 is a conceptual diagram of a state of the warehouse environment after a first swap of task assignments.

FIG. 2 is a conceptual diagram of a state of the warehouse environment 100 after a first swap of task assignments. Although one swap is depicted in FIG. 2, multiple swaps can be performed by the computing system 114 at a given time. The computing system 114 can perform multiple swaps at a time (e.g., every second) in order to keep up with how fast a state of the warehouse environment 100 can change. Thus, a most optimal task swap and selection can be made in a short period of time.

At time=1, the computer system 114 can swap tasks (step A, 204). In other words, the computer system 114 can assign a task to be completed by the forklift 104B to the forklift 104A and vice versa. In some implementations, the computer system 114 can swap destinations for completing one or more tasks that are assigned to one or more of the forklifts 104A-B. The computer system 114 can also swap source items/pallets for completing one or more tasks that are assigned to one or more of the forklifts 104A-B. In some implementations, the computer system 114 can swap first tasks that are assigned to each of the forklifts 104A-B. In some implementations, the computer system 114 can randomly select which tasks to swap between the forklifts 104A-B. Thus, inbound tasks can be swapped with inbound tasks, outbound tasks can be swapped with outbound tasks, and inbound tasks can be swapped with outbound tasks.

When choosing which tasks to swap, the computer system 114 can first determine whether it is feasible for either of the forklifts 104A-B to perform the swapped tasks. For example, the computer system 114 can determine whether the forklift 104B has necessary equipment to complete a task that would have been completed by the forklift 104A (e.g., forklifts can complete tasks on different storage levels in the storage area 106 while a warehouse jack may only be able to complete tasks on low storage levels in the storage area 106). If the forklift 104B does have the necessary equipment to complete the task, then the computer system 114 can continue to assess whether implementing the swap can result in an improvement of global efficiency and forklift efficiency.

Once the computer system 114 swaps the tasks, the computer system 114 can determine a change in time efficiency for each of the forklifts 104A-B (step B, 206). Based on the change in time efficiency, the computer system 114 can determine whether swapping the tasks resulted in an improvement on global warehouse and/or forklift efficiency.

As shown in FIG. 2, the computer system 114 can revert the swap and keep the initial task assignments (step C, 208). The computer system 114 can make this determination when the change in time efficiency for each of the forklifts 104A-B is not an improvement from the time efficiency metrics that were projected for the initial task assignments.

In the example of FIG. 2, task swap table 200 demonstrates a swap made by the computer system 114. The computer system 114 assigned the forklift 104A task 112D', which was the task 112D initially assigned to the forklift 104B (refer to FIG. 1). The computer system 114 assigned the forklift 104B task 112A', which was the task 112A initially assigned to the forklift 104A (refer to FIG. 1). Based on this swap, the computer system 114 projected that the forklift 104A can complete the task 112D' in 1 minute 30 seconds, but will experience 2 minutes of empty travel time along empty travel route 110D'. In the initial task assignment depicted in FIG. 1, the computer system 114 had projected that the forklift 104B could complete the task 112D in 1 minute and 30 seconds with 1 minute and 30 seconds of empty travel time along the empty travel route 110D. Thus, the computer system 114 can determine that it is more efficient to revert the swap back to the initial task assignment since the forklift 104B can complete the task 112D with 30 seconds less of empty travel time than the forklift 104A.

The computer system 114 also projected that based on the swap, the forklift 104A can complete the originally assigned task 112B next in 6 minutes. However, the computer system 114 projected that the forklift 104A can experience 5 minutes and 30 seconds of empty travel time along empty travel route 110B' in order to complete the task 112B. In the initial task assignment depicted in FIG. 1, the computer system had projected that the forklift 104A could complete the task 112B in 6 minutes and experience only 1 minute and 30 seconds of empty travel time along the empty travel route 110B. Thus, the computer system 114 can determine that it is more efficient to revert the swap back to the initial task assignment since the forklift 104A can complete the task 112B with 4 minutes less of empty travel time when the task 112B follows the initial task 112A.

Similarly, based on the swap, the computer system 114 projected that the forklift 104B can complete the task 112A' in 5 minutes, but will experience 30 seconds of empty travel time along empty travel route 110A'. In the initial task assignment depicted in FIG. 1, the computer system had projected that the forklift 104A could complete the task 112A in 5 minutes with 1 minute of empty travel time along the empty travel route 110A. Thus, the computer system 114 can determine that it may be efficient to keep the swap since the forklift 104B can complete the task 112A' with 30 seconds of empty travel time along the empty travel route 110A'. Regardless, when the 30 seconds of empty travel time is combined with the other empty travel times to determine a total empty travel time for the forklift 104B based on the swap, the total empty travel time for the forklift 104B may not be improved.

The computer system 114 also projected that based on the swap, the forklift 104B can complete the originally assigned task 112E next in 3 minutes. However, the computer system 114 projected that the forklift 104B can experience 5 minutes of empty travel time along empty travel route 110E' in order to complete the task 112E. In the initial task assignment depicted in FIG. 1, the computer system had projected that the forklift 104B could complete the task 112E in 3 minutes and experience 2 minutes of empty travel time along the empty travel route 112E. Thus, the computer system 114 can determine that although the forklift 104B can complete the task 112E in 3 minutes whether or not the tasks are swapped, the forklift 104B can experience 3 more minutes of empty travel time along the empty travel route 110E'. Therefore, swapping the tasks may not be efficient.

Based on the swap, the computer system 114 can also generate a task swap time efficiency table 202. The table 202 can indicate projected total empty travel time per forklift based on the swap. The table 202 also indicates projected global empty travel time for the warehouse environment 100. Based on assigning the forklift 104A the task 112D' and assigning the forklift 104B the task 112A', the forklift 104A is projected to experience a total of 10 minutes and 30 seconds of empty travel time. Under the initial task assignments depicted in FIG. 1, the forklift 104A was only expected to experience 5 minutes and 30 seconds of empty travel time. Thus, the swap would cause the forklift 104A to experience 5 more minutes of empty travel time, which is an indication of increased inefficiency resulting from the swap.

The forklift 104B is projected to experience a total of 6 minutes and 30 seconds of empty travel time based on the swap. Under the initial task assignments depicted in FIG. 1, the forklift 104B was expected to experience 4 minutes and 30 seconds of empty travel time. Thus, the swap would cause the forklift 104B to experience 2 more minutes of empty travel time, which is an indication of increased inefficiency resulting from the swap.

Finally, the projected global empty travel time for the warehouse environment 100 amounts to 17 minutes based on the swap. Under the initial task assignments depicted in FIG. 1, the projected global empty travel time was 10 minutes. Thus, the swap would cause increased inefficiency in the overall warehouse environment 100.

Based on such analysis and as described above, the computer system 114 can revert the swap and keep the initial task assignments (step C, 208).

Figure 3:
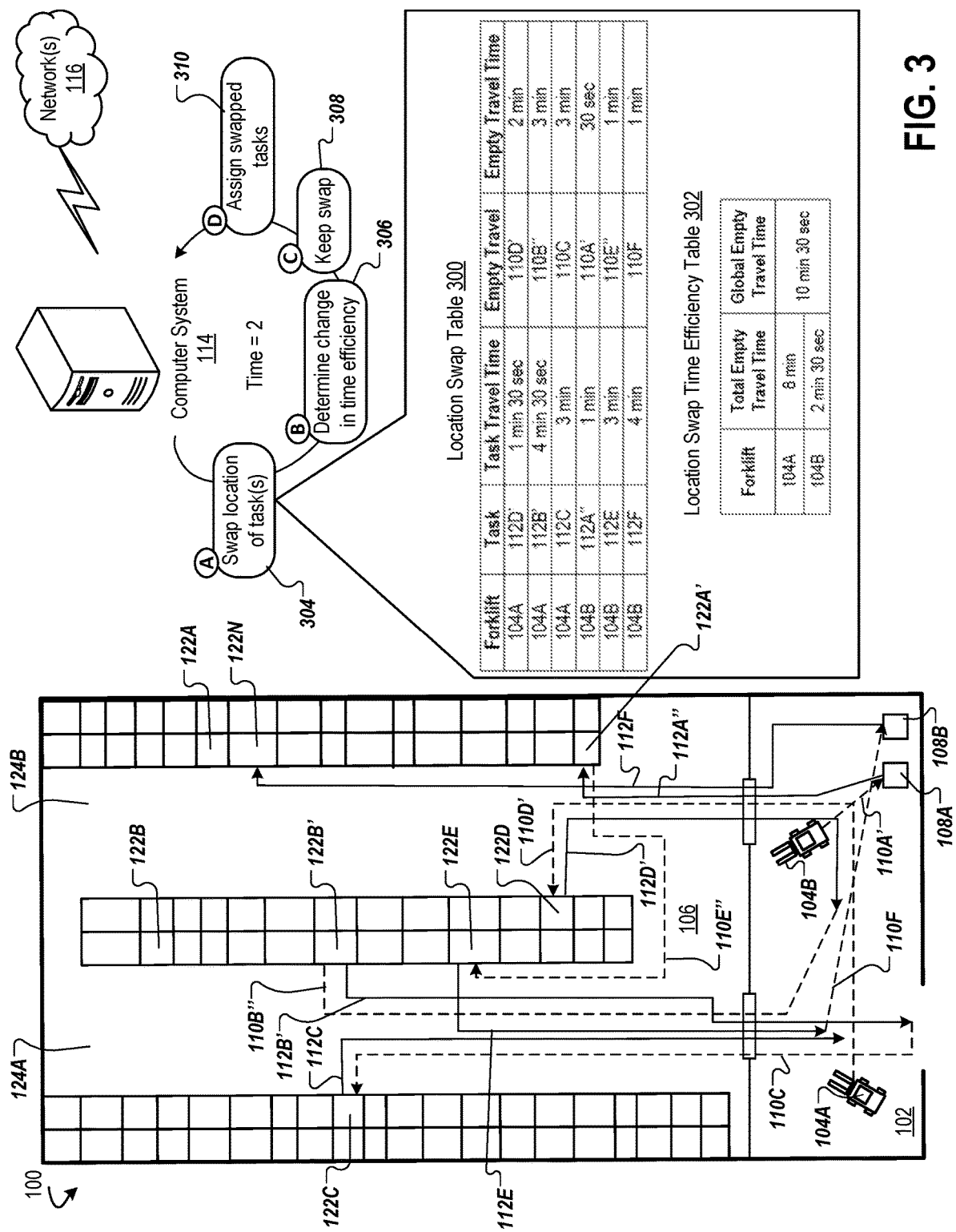
FIG. 3 is a conceptual diagram of a state of the warehouse environment after a second swap of task assignments.
Figure 4A:
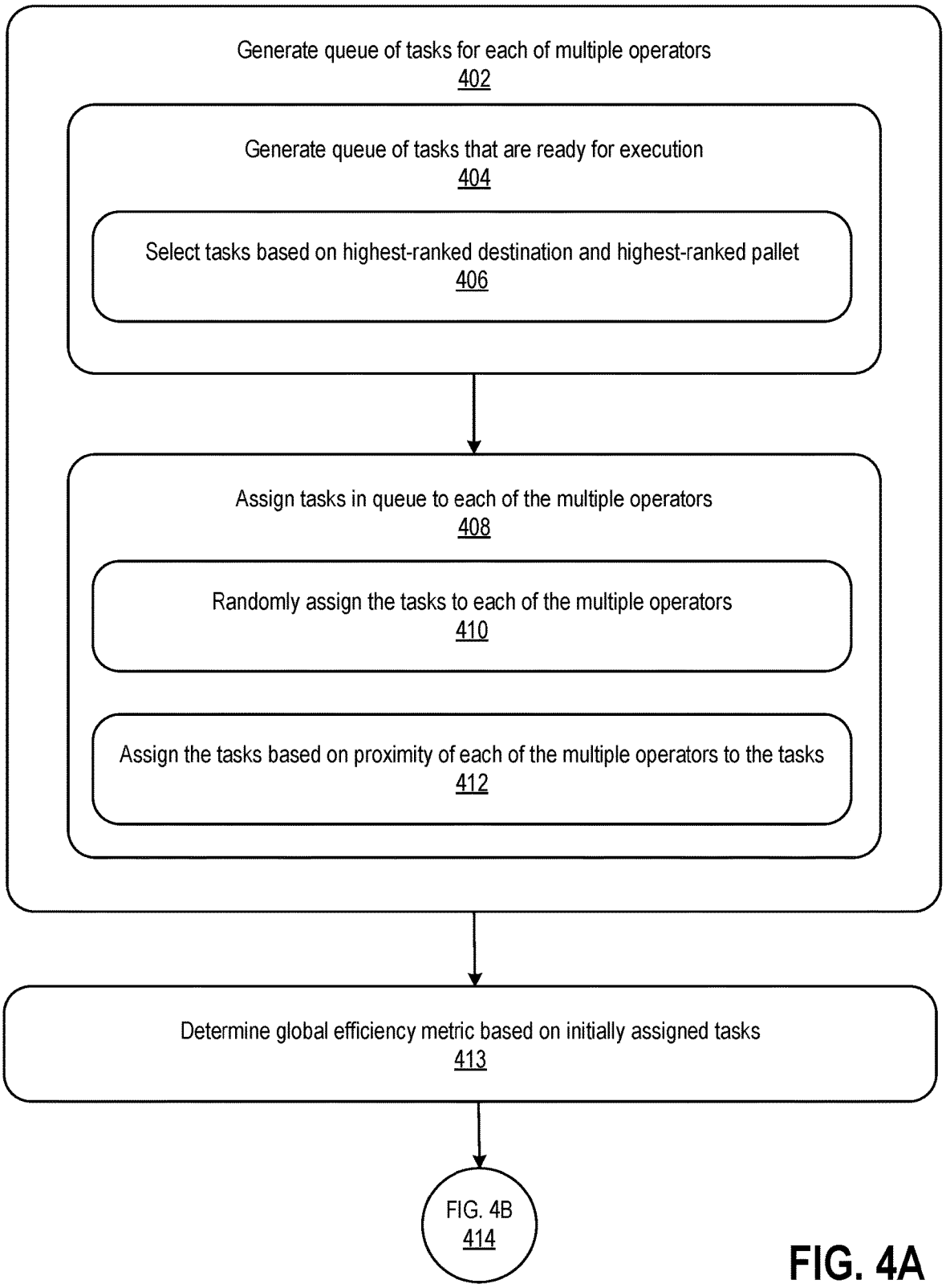
FIGS. 4A-E is a flowchart of a process for determining an optimal task selection for a warehouse operator.
Figure 4B:
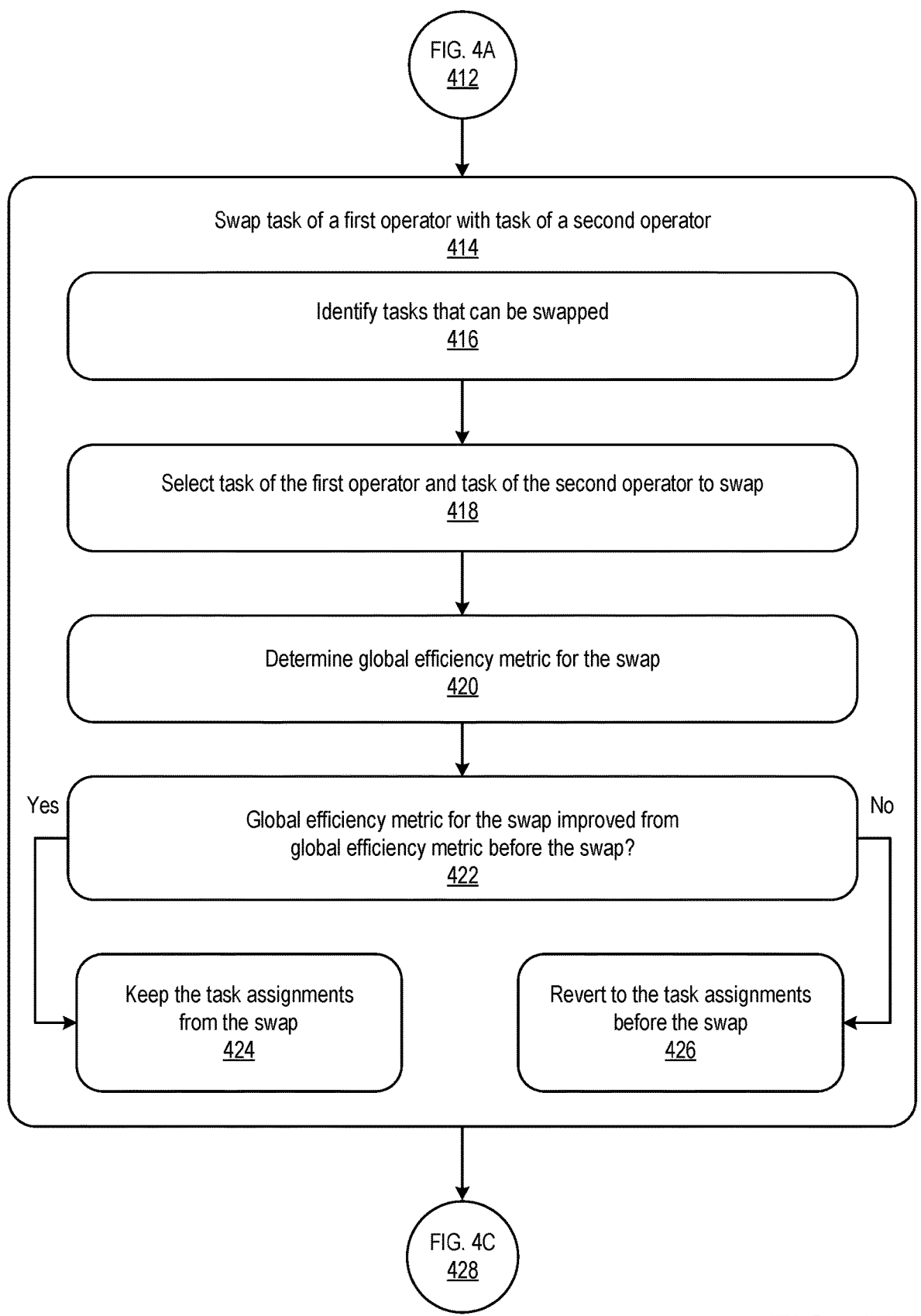
Figure 4C:
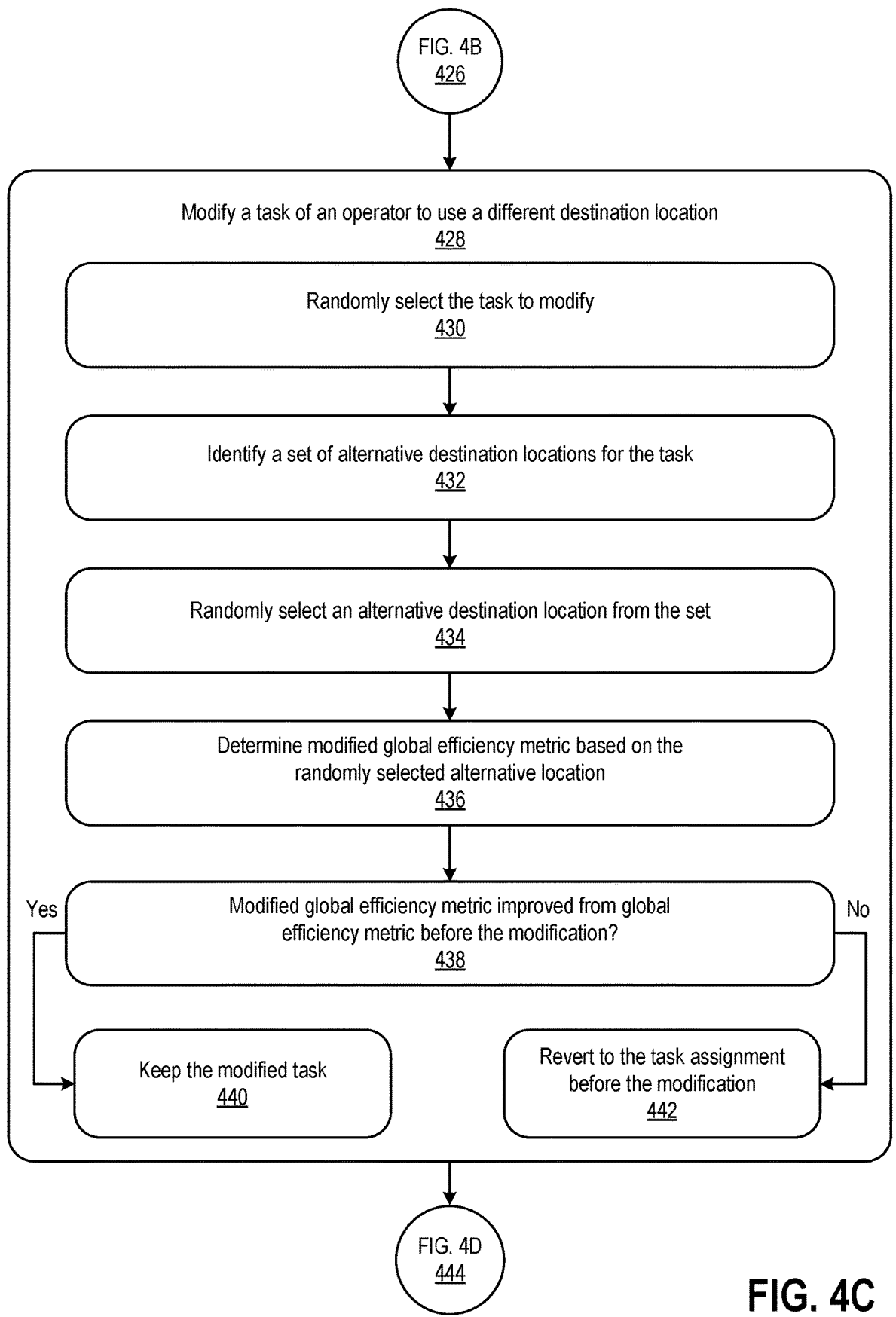
Figure 4D:
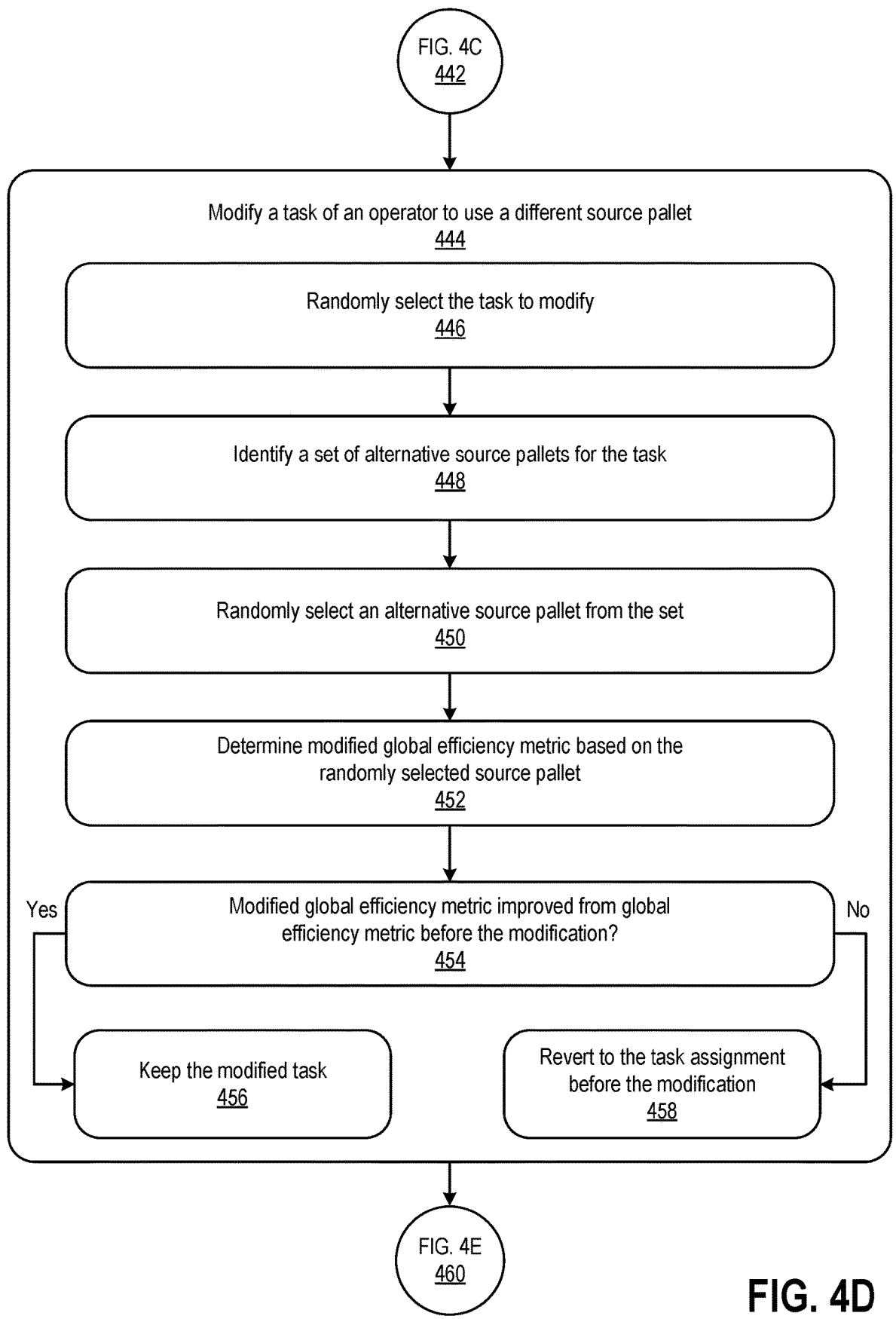
Figure 4E:
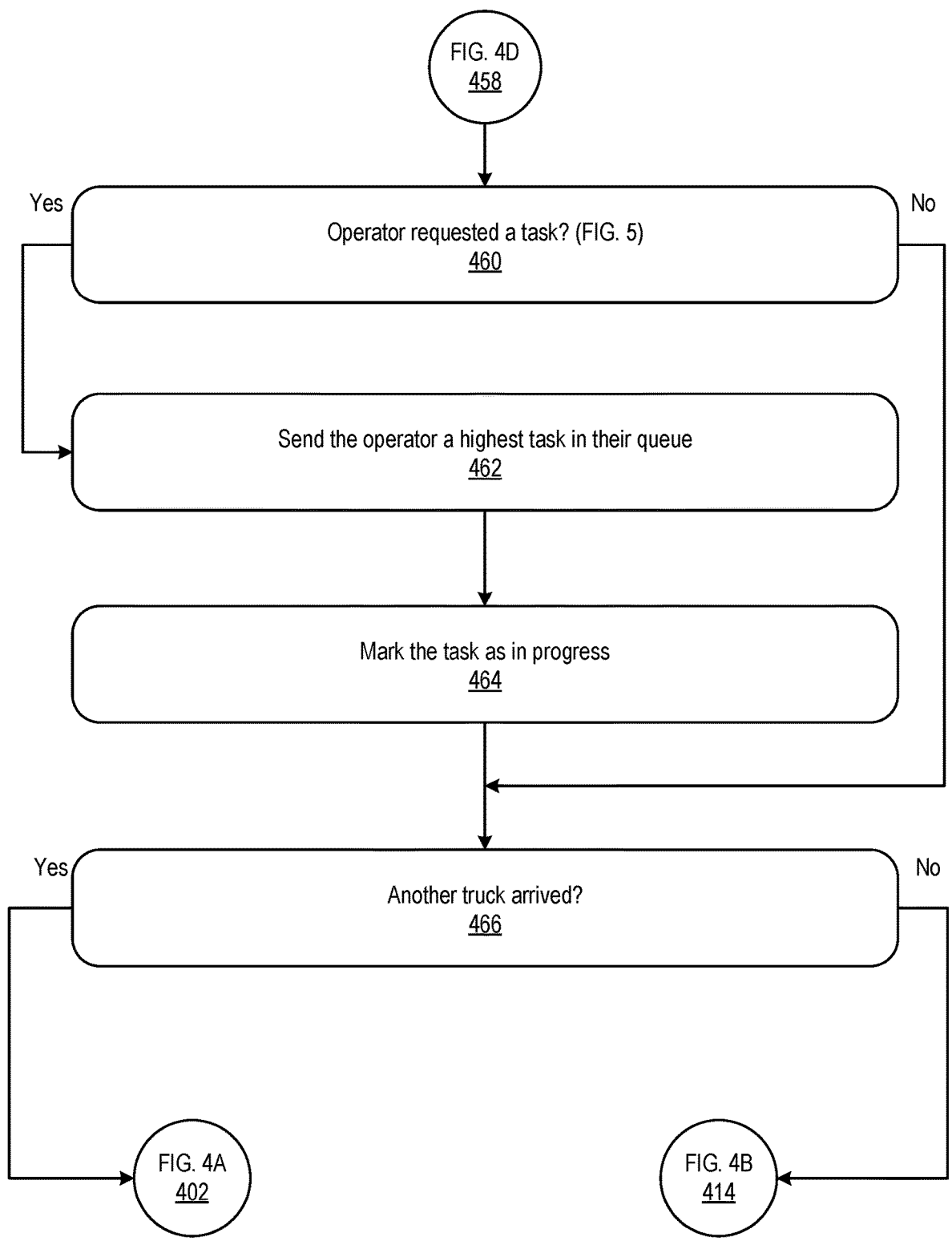

FIG. 3 is a conceptual diagram of a state of the warehouse environment 100 after a second swap of task assignments. At time=2, the computer system 114 can swap location(s) of task(s) (step A, 304). Not only did the computer system 114 assign task 112D' to forklift 104A, the computer system 114 also changed a location of the original task 112B, thereby modifying the original task 112B to task 112B'. The computer system 114 also assigned the original task 112A to the forklift 104B and changed a location of the original task 112A, thereby modifying the original task 112A to task 112A". The swaps made by the computer system 114 are depicted in location swap table 300.

Once the computer system 114 swaps the tasks, the computer system 114 can determine a change in time efficiency for each of the forklifts 104A-B (step B, 306). Based on the change in time efficiency, the computer system 114 can determine whether swapping the tasks resulted in an improvement on global warehouse and/or forklift efficiency.

As shown in FIG. 3, the computer system 114 can keep the swap (step C, 308). The computer system 114 can make this determination when the change in time efficiency for each of the forklifts 104A-B is improved from the time efficiency metrics that were projected for the initial task assignments and/or any previous swaps. Moreover, the computer system 114 can assign the swapped tasks to each of the forklifts 104A-B (step D, 310).

Based on the example swap in FIG. 3, the computer system 114 projected that the forklift 104A can complete the task 112D' in 1 minute 30 seconds, but will experience 2 minutes of empty travel time along empty travel route 110D'. In the first attempted swap depicted in FIG. 2, the computer system 114 had projected that the forklift 104B could complete the task 112D' in 1 minute and 30 seconds with 2 minutes of empty travel time along the empty travel route 110D'. Thus, the computer system 114 can determine that there is no improvement in efficiency with the swap of FIG. 3.

The computer system 114 also projected that based on changing the task 112B' location from 122B to 122B', the forklift 104A can complete the task 112B' in 4 minutes and 30 seconds and experience 3 minutes of empty travel time along the empty travel route 110B". In the first attempted swap depicted in FIG. 2, the computer system 114 projected that the forklift 104A could complete the task 112B in 6 minutes and experience 5 minutes and 30 seconds of empty travel time along the empty travel route 110B. The computer system 114 can therefore determine that changing the task 112B' location from 122B to 122B' resulted in saving the forklift 104A 2 minutes and 30 seconds in empty travel time. Thus, efficiency of the forklift 104A improved from the swap in FIG. 3.

Additionally, based on assigning the task 112A" to the forklift 104B and changing the task 112A" location from 122A to 122A', the forklift 104B can complete the task 112A" in 1 minute and experience 30 seconds of empty travel time along empty travel route 110A'. In the first attempted swap depicted in FIG. 2, the computer system 114 projected that the forklift 104B could complete the task 112A' in 5 minutes and experience 30 seconds of empty travel time along the empty travel route 110A'. Although the empty travel time is the same in both swaps, the computer system 114 can determine that the swap in FIG. 3 is better than the swap in FIG. 2 because the forklift 104B can complete the task 112A" in 3 minutes and 30 seconds less time than completing the task 112A'. Thus, changing or swapping the destination location of the task 112A" from location 122A to location 122A' improved efficiency of the forklift 104B.

Based on changing the destination location 122A' for the task 112A", the computer system 114 also projected that the forklift 104B can complete the task 112E in 3 minutes and experience 1 minute of empty travel time along empty travel route 110E". In the first attempted swap depicted in FIG. 2, the computer system 114 projected that the forklift 104B could complete the task 112E in 3 minutes and experience 5 minutes of empty travel time along the empty travel route 110E'. The long amount of empty travel time is because the forklift 104B would have to travel from location 122A in aisle 124B to location 122B in aisle 124A. By changing the destination location of the task 112A" to the location 122A', the forklift 104B can complete the task 112E with 4 minutes less of empty travel time along the empty travel route 110E". This is because the location 122A' is closer to the location 122E of the task 112E. Thus, the computer system 114 can determine that changing the location of the task 112A" resulted in improved efficiency for the forklift 104B to complete the task 112E.

Based on the swaps discussed above in reference to FIG. 3, the computer system 114 can generate a location swap time efficiency table 302. The table 302 can indicate projected total empty travel time per forklift based on the swap. The table 302 also indicates projected global empty travel time for the warehouse environment 100. Based on the swaps discussed in FIG. 3, the forklift 104A is projected to experience a total of 8 minutes of empty travel time. Under the first attempted swap in FIG. 2, the forklift 104A was projected to experience 10 minutes and 30 seconds of empty travel time. Thus, the swaps in FIG. 3 would cause the forklift 104A to be more efficient in completing tasks by 1 minute and 30 seconds.

The forklift 104B is projected to experience a total of 2 minutes and 30 seconds of empty travel time based on the swaps of FIG. 3. Under the first attempted swap in FIG. 2, the forklift 104B was projected to experience 6 minutes and 30 seconds of empty travel time. Thus, the swaps in FIG. 3 would cause the forklift 104B to be more efficient in completing tasks by 4 minutes.

Finally, the projected global empty travel time for the warehouse environment 100 amounts to 10 minutes and 30 seconds based on the swaps in FIG. 3. Under the first attempted swap in FIG. 2, the global empty travel time was projected to be 17 minutes. Thus, the swaps in FIG. 3 can improve overall warehouse efficiency.

Based on such analysis and as described above, the computer system 114 can keep the swaps in FIG. 3 and assign the swapped tasks to the forklifts 104A-N (steps C-D, 308-310).

FIGS. 4A-E is a flowchart of a process 400 for determining an optimal task selection for a warehouse operator. The process 400 can be performed by the computer system 114. The process 400 can also be performed by one or more other computer systems, servers, and/or networks of devices. For illustrative purposes, the process 400 is described in reference to a computer system.

Referring to the process 400 in FIGS. 4A-E, the computer system can generate a queue of tasks for each of multiple operators in 402. As described herein, the operators can be warehouse workers, forklifts, and/or other warehouse vehicles that can be used to perform tasks and operations in the warehouse. Moreover, as described herein, the tasks can be associated with a docking area, full pallet movements, and/or case picking.

The computer system can generate a list of tasks that are ready for execution in 404. The computer system can identify a collection of item-movement tasks to perform in the warehouse (e.g., a storage facility). Each item-movement task in the collection of item-movement tasks can indicate movement of a respective item from a respective source location to a respective destination location. For example, the respective item can be a full pallet. The source location of the full pallet can be a docking area and the destination location can be a bay or rack in a storage area where the full pallet is to be stored. This example task can be a put away or inbound task. Generating the list of tasks also includes determining whether the tasks are feasible to be executed at a current time. The tasks can be feasible for execution if, for example, source and/or destination locations associated with the tasks are currently available/accessible. A task can also be feasible for current execution if a pallet for that task is not currently blocked or otherwise inaccessible.

The computer system can also select tasks based on highest-ranked destination and highest-ranked pallet in 406. The highest-ranked destination can be used for inbound or put away tasks. The highest-ranked pallet can be used for outbound or pull tasks. The highest-ranked destination and/or the highest-ranked pallet can indicate an importance or immediacy to perform the associated tasks. For example, a first pallet that arrived at the docking area can have a highest-ranked destination because the first pallet can require cold storage. The longer the first pallet remains in the docking area, the more likely items on the first pallet can spoil or melt. Thus, the first pallet can be selected for the queue as a having the highest-ranked destination. As another example, a second pallet in storage can be designated as a highest-ranked pallet because it can part of a customer pick order that needs to be fulfilled within a threshold period of time. The threshold period of time can be running out, which means the second pallet may need to be pulled from storage immediately. Thus, the second pallet can be selected for the queue as being the highest-ranked pallet. The tasks that are selected based on highest-ranked destination and/or highest-ranked pallet can be slotted at a top of the queues for each of the multiple operators.

As part of generating the queue of tasks for each of the multiple operators, the computer system can assign tasks in the list to each of the multiple operators in 408. The computer system can distribute item-movement tasks in the collection of item-movement tasks among multiple queues of item-movement tasks corresponding to multiple moving machines (e.g., warehouse operators), to form a first state of the multiple queues of item-movement tasks. Each moving machine of the multiple moving machines can have a respective queue of item-movement tasks to perform. For example, a first moving machine of the multiple moving machines can have a first queue of item-movement tasks from among the multiple queues of item-movement tasks, and a second moving machine of the multiple moving machines can have a second queue of item-movement tasks from among the multiple queues of item-movement tasks.

When assigning the tasks to each of the multiple operators in 408, the computer system can determine whether the operators have the capability to perform the tasks. For example, a forklift can reach higher levels in the warehouse than a human worker or a warehouse jack. Thus, tasks that may require accessing higher levels in the warehouse can be assigned to operators having equipment such as forklifts that can access the higher levels. As another example, tasks that require minimum movement on a floor of the warehouse can be assigned to operators who are walking around the warehouse by foot, whereas tasks that require greater movement and distance to cover in the warehouse can be assigned to operators having forklifts.

In some implementations, the computer system can randomly assign the tasks to each of the multiple operators in 410. Such random assignments can still take into consideration whether the operator has the necessary equipment to complete the tasks.

The computer system can also assign the tasks based on proximity of each of the multiple operators to the tasks in 412. For example, the computer system can receive, from the operator, a current location of the operator. The computer system can compare the current location of the operator to start locations of tasks that need to be assigned. The computer system can then assign, to that operator, a task having the closest start location to the current location of the operator.

Once the computer system generates the queues of tasks for each of the multiple operators in 402-412, the computer system can determine a global efficiency metric for the warehouse as well as each of the operators based on the initially assigned tasks (413). In other words, the computer system can determine a first value that indicates utilization of the multiple moving machines. The first value can be based on the multiple moving machines performing the multiple queues of item-movement tasks while the multiple queues of item-movement tasks have the first state. The global efficiency metric, as described herein, can be a measure of how efficiently the operators are utilized. The global efficiency metric can be an amount of empty time that is spent, in aggregate, by the operators moving between tasks in the operators' queues of tasks (e.g., refer to FIGS. 1-3).

Next, the computer system can swap a task of a first operator with a task of a second operator in 414. Thus, the computer system can swap a first item-movement task from the first queue of item-movement tasks with a second item-movement task from the second queue of item-movement tasks, to form a second state of the multiple queues of item-movement tasks. As a result, the first queue of item-movement tasks that can be performed by the first moving machine no longer includes the first item-movement task but now includes the second item-movement task. The second queue of item-movement tasks to be performed by the second moving machine may no longer include the second item-movement task but now may include the first item-movement task. In some implementations, the computer system can swap tasks in a queue of a single operator instead of or in combination with swapping tasks between the first queue of the first operator and the second queue of the second operator.

As part of swapping tasks, the computer system can identify tasks that can be swapped in 416. For example, the computer system can determine whether tasks are currently in progress or ready for execution. The computer system can also determine whether a first task of the first operator can be performed by the second operator based on whether the second operator has the necessary equipment to complete the first task. As an illustrative example, the first task can require an operator to place a pallet on a third level of a rack in the storage area. The first task can be initially assigned to the first operator, which has an appropriate lift truck to store the pallet on the third level of the rack. The first task cannot be swapped with a task of the second operator, however, because the second operator may have a pallet jack. The pallet jack may only lift the pallet to a certain height that is less than the third level of the rack where the pallet for the first task needs to be placed. Thus, the computer system can determine that the first task of the first operator cannot be swapped with a task of the second operator.

The computer system can select the task of the first operator and the task of the second operator to swap in 418. For example, the computer system can select a first task in each of the queues of the first and second operators to swap. The computer system can also select a first task in the queue of the first operator and a second task in the queue of the second operator to swap. The computer system can make any random selection of tasks to swap from the queues of the first and second operators. In some implementations, the tasks can be randomly selected from the queues of the first and second operators. In some implementations, block 418 can be optional.

The computer system can then determine a global efficiency metric for the queues after the swap in 420. The computer system can determine a second value that indicates utilization of the multiple moving machines based on the multiple moving machines performing the multiple queues of item-movement tasks while the multiple queues of item-movement tasks have the second state. The first value that indicates utilization of the multiple moving machines can indicate a first amount that the multiple moving machines are without an item (e.g., empty travel time) to move during performance of the multiple queues of item-movement tasks while the multiple queues of item-movement tasks have the first state. The second value that indicates utilization of the multiple moving machines can indicate a second amount that the multiple moving machines are without an item to move during performance of the multiple queues of item-movement tasks while the multiple queues of item-movement tasks have the second state.

As described throughout, the global efficiency metric can comprise a measure of how much empty travel time exists for each of the operators in between performing tasks that have been swapped. Thus, the computer system can project how much empty travel time the first operator can experience between a first task and a second task, wherein the second task was originally assigned to the second operator. The computer system can also project how much empty travel time the second operator can experience between a third task and a fourth task, wherein the fourth task was originally assigned to the first operator. Thus, the computer system could have swapped the second and fourth tasks between the first and second operators. The computer system can combine the projected empty travel times of the first and second operators in order to determine the global efficiency metric, which can indicate a total amount of empty travel time for the warehouse based on the swapped tasks. The global efficiency metric can be an indicator of how efficiently the warehouse is operating.

The computer system can determine whether the global efficiency metric of the swap improved from a global efficiency metric before the swap (e.g., the global efficiency metric of the initial task assignments in 413) in 422. The global efficiency metric of the swap can improve if in aggregate, the operators are spending less empty travel time between the swapped tasks than the operators were spending between the initially assigned tasks. In some implementations, the efficiency of the first operator can improve from the task swap but the efficiency of the second operator may not improve. Such changes in efficiency may or may not have an impact on the overall global efficiency metric for the warehouse. It can be desired to achieve an overall decrease in empty travel time for the warehouse, which can indicate overall improved efficiency for the warehouse.

In some implementations, the computer system can also set an overdue penalty to the swapped tasks in order to incentivize the tasks to be completed quickly. Thus, the tasks can be required to be completed within maximum timeframes, such as 2 hour windows. The maximum timeframe can be dynamically determined based on a type of task and/or a type of item associated with the task. For example, inbound tasks for pallets that need to be refrigerated can have smaller maximum timeframes for completion than inbound tasks for pallets that have no storage restraints. After all, the pallets requiring refrigeration may melt or spoil if not properly stored in a cold storage area within the maximum timeframe.

A penalty can be assigned to the operator if it takes the operator more than the maximum timeframe to complete the task. Each minute over the maximum timeframe can be penalized as a square of that minute. One or more other quadratic equations or offset values can be used to determine the penalty. In some implementations, the penalty can be applied at a 2 hour mark of the maximum timeframe. The penalty can then be increased as a square of the penalty for every extra minute over the 2 hour mark. The penalty is a weight that can then be applied to the empty travel time for each of the operators. Thus, where the operator does not complete a task within the maximum timeframe, the operator's efficiency metric can decrease because the operator is not efficient in completing tasks.

If the global efficiency metric of the swap is improved, then the computer system can keep the task assignments from the swap in 424. The computer system can leave the multiple queues of item-movement tasks in the second state as a result of determining, based on comparison of the first value to the second value, that utilization of the multiple moving machines is greater when the multiple queues of item-movement tasks have the second state. In other words, the computer system can determine that the swap resulted in improved utilization of resources in comparison to the initial task assignments. One or more of the first and second operators can be spending less empty travel time between tasks. As a result, the global efficiency metric for the warehouse can improve.

If the global efficiency metric of the swap is not improved, then the computer system can revert to the task assignments before the swap in 426. The computer system can determine, based on comparison of the first value to the second value, that utilization of the multiple moving machines is greater when the multiple queues of item-movement tasks have the first state. As a result, the computer system can swap, based on determining that utilization of the multiple moving machines is greater when the multiple queues of item-movement tasks have the first state, the first item-movement task in the second queue of item-movement tasks with the second item-movement task in the first queue of item-movement tasks, to revert the multiple queues of item-movement tasks to the first state.

In addition to swapping the tasks in 414-426, the computer system can modify a task of an operator to use a different destination location in 428 (e.g., refer to FIG. 3). For example, the computer system can change a destination location for a put away pallet or inbound task. The computer system can also change a source pallet for a pull task or outbound task. The computer system can determine a third value that indicates utilization of the multiple moving machines based on the multiple moving machines performing the multiple queues of item-movement tasks while the multiple queues of item-movement tasks have a third state. The computer system can also modify a third item-movement task from the first queue of item-movement tasks while the multiple queues of item-movement tasks have the third state (i) from having an original destination location at which to place an item to be moved by the third-item-movement task (ii) to having an alternative destination location at which to place the item to be moved by the third item-movement task, to form a fourth state of the multiple queues of item-movement tasks.

As part of modifying the task to use the different destination location, the computer system can randomly select the task to modify in 430. For example, the computer system can randomly select a task from a queue of a first operator. In some implementations, the computer system can select a highest-ranked task from the queue of the first operator.

The computer system can identify a set of alternative destination locations for the selected task in 432. The set of alternative destination locations can include locations that are currently available. The set of alternative destination locations may not include locations that are currently being used in a task. For example, if a task is in progress at a first alternative destination location, then the computer system may not identify that first alternative destination location in the set for the selected task. The set of alternative destination locations may also include locations that satisfy any storage conditions for the selected task. For example, if the selected task involves storing a pallet in cold storage, then the computer system may only identify alternative destination locations that are in cold storage. As another example, the computer system can identify alternative destination locations that satisfy other storage conditions, such as size and weight dimensions for the selected task.

Moreover, the computer system can identify alternative destination locations that can be accessed by the operator who is assigned to the selected task. For example, if the operator drives a lift truck, then the alternative destination locations can be multiple levels off the ground since the lift truck can access the higher levels. On the other hand, if the operator operates a pallet jack, then the alternative destination locations can be on a first level with the ground since the pallet jack can only raise a pallet so high. As yet another example, if the operator is walking around the warehouse, then the alternative destination locations can be locations on the ground level of the warehouse that are not too great of distances for the operator to walk to while carrying the pallet or item(s).

The computer system can randomly select an alternative destination location from the set in 434. In some implementations, the computer system can select a highest ranked alternative destination location. In some implementations, the computer system can select an alternative destination location that is closest to a current location of the operator.

The computer system can then determine a modified global efficiency metric based on the randomly selected alternative location in 436. The computer system can determine a fourth value that indicates utilization of the multiple moving machines based on the multiple moving machines performing the multiple queues of item-movement tasks while the multiple queues of item-movement tasks have the fourth state. The fourth state, as described above, can be when a scenario when the alternative destination location is selected from the set of alternative destination locations. In other words, the computer system can determine how much empty travel time the operator may experience by performing the task with the selected alternative destination location.

The computer system can determine whether the modified global efficiency metric improved from a global efficiency metric before the modification in 438. As described above, the computer system can determine whether selecting the alternative destination location reduced the empty travel time for the operator and/or aggregate empty travel time for the warehouse.

If the modified global efficiency metric is improved, then the modified task can be kept in 440. For example, the computer system can leave the multiple queues of item-movement tasks in the fourth state as a result of determining, based on comparison of the third value to the fourth value, that utilization of the multiple moving machines is greater when the multiple queues of item-movement tasks have the fourth state. Thus, selecting the alternative destination location resulted in reducing the empty travel time of the operator and/or the aggregate empty travel time for the warehouse. Because the operator and/or the warehouse are more efficient, the swap in blocks 428-438 can be kept.

If the modified global efficiency metric is not improved, then the computer system can revert to task assignments before the modification in 442. For example, the computer system can determine, based on comparison of the third value to the fourth value, that utilization of the multiple moving machines is greater when the multiple queues of item-movement tasks have the third state. Accordingly, the computer system can modify the third item-movement task to have the original destination location, to revert the multiple queues of item-movement tasks to the third state.

As mentioned above, in some implementations, the computer system can modify a source pallet for a task instead of or in addition to modifying the destination location for the task (444). Similar to modifying the destination location of the task, the computer system can randomly select a task to modify a source pallet in 446.

The computer system can then identify a set of alternative source pallets for the selected task in 448. The alternative source pallets can be identified based on whether they have a same type of items as the items in the selected task. The alternative source pallets can also be identified based on whether they have same storage conditions, customer number/identifier, SKU, quantity, as the selected task. In some implementations, the alternative source pallets can also be identified based on whether they are accessible, currently available (e.g., not currently used to complete a task), and/or the operator has the necessary equipment to access the alternative source pallets.

Once the alternative source pallets are identified, the computer system can randomly select an alternative source pallet in 450. The computer system can modify the third item-movement task from the first queue of item-movement tasks while the multiple queues of item-movement tasks have the third state (i) from selecting an original item from an original source location (ii) to selecting an alternative item from an alternative location to form the fourth state of the multiple queues of item-movement tasks, the alternative item being a same type of item as the original item. As described in reference to selecting the alternative destination location, the computer system can select any of the alternative source pallets, a highest-ranked alternative source pallet, and/or an alternative source pallet that is closest to a current location of the operator.

The computer system can then determine a modified global efficiency metric based on the randomly selected source pallet in 452. In other words, the computer system can determine how much empty time the operator can spend between tasks when the selected task involves the randomly selected source pallet. The computer system can determine the third value that indicates utilization of the multiple moving machines based on the multiple moving machines performing the multiple queues of item-movement tasks while the multiple queues of item-movement tasks have the third state. The third state can be a state of the warehouse before the alternative source pallet was randomly selected. The computer system can also determine the fourth value that indicates utilization of the multiple moving machines based on the multiple moving machines performing the multiple queues of item-movement tasks while the multiple queues of item-movement tasks have the fourth state. The fourth state is when the alternative source pallet has been randomly selected.

The computer system can then determine whether the modified global efficiency metric improved from the global efficiency metric before the modification in 454. In other words, the computer system can determine whether the operator experiences less empty time between tasks when the operator completes the selected task with the randomly selected alternative source pallet than when the operator completes the selected task with the original source pallet.

If the modified global efficiency metric is improved, the computer system can keep the modified task with the selected alternative source pallet in 456. The computer system can determine, based on comparison of the third value to the fourth value, that utilization of the multiple moving machines is less when the multiple queues of item-movement tasks have the third state. Thus, the computer system can leave the third item-movement task in the fourth state. The fourth state, as described above, indicates that the source pallet was swapped with another source pallet.

If the modified global efficiency metric is not improved, then the computer system can revert to the task assignment before the modification was made in 458. The computer system can determine, based on comparison of the third value to the fourth value, that utilization of the multiple moving machines is greater when the multiple queues of item-movement tasks have the third state. Thus, the computer system can modify the third item-movement task to select the original item from the original source location, to revert the multiple queues of item-movement tasks to the third state.

As an example, the randomly selected alternative source pallet can be located behind pallets in a storage rack. The original source pallet can be located in front of other pallets in a storage rack. By completing the same task but retrieving the alternative source pallet, the operator may be required to spend time removing the pallets in front of the alternative source pallet, pulling out the alternative source pallet, and then returning the other pallets to the storage rack. On the other hand, by completing the same task but retrieving the original source pallet, the operator may only be required to pick up the original source pallet without moving any other pallets. As a result, the operator can spend less time picking up the original source pallet, thereby spending less overall time to complete the task. The computer system can therefore determine that the operator is more efficient if the operator completes the task with the original source pallet. Thus, the computer system can revert to the task assignment involving the original source pallet rather than the randomly selected alternative source pallet.

As yet another example, the randomly selected alternative source pallet can be located behind pallets in a storage rack. The original source pallet can be located in front of other pallets in a storage rack. However, the randomly selected alternative source pallet can be in a location that is closer to the current location of the operator and the original source pallet can be located farther away from the current location of the operator. Thus, by completing the task with the randomly selected alternative source pallet, the operator can spend less time completing the task, even if the operator must pull the other pallets out before accessing the alternative source pallet. Since the overall completion time of the task with the randomly selected alternative source pallet can be less than the overall completion time of the task with the original source pallet, the computer system can keep the modification and assign the task to the operator with the randomly selected alternative pallet.

The computer system can continuously repeat blocks 414-458 in the process 400. For example, in some implementations, whenever the computer system determines that a modification or swap should not be kept (e.g., refer to blocks 426, 442, and 458), the computer system can try swapping or modifying different tasks for the same or different operators. Since the computer system can continuously repeat blocks 414-458, swaps and/or modifications can be made relative to dynamic changes to a state of the warehouse. The computer system can therefore make accurate and effective swap and/or modification determinations as well as global efficiency metric assessments based on the current state of the warehouse, which can be advantageous to improve overall warehouse efficiency.

Figure 5:
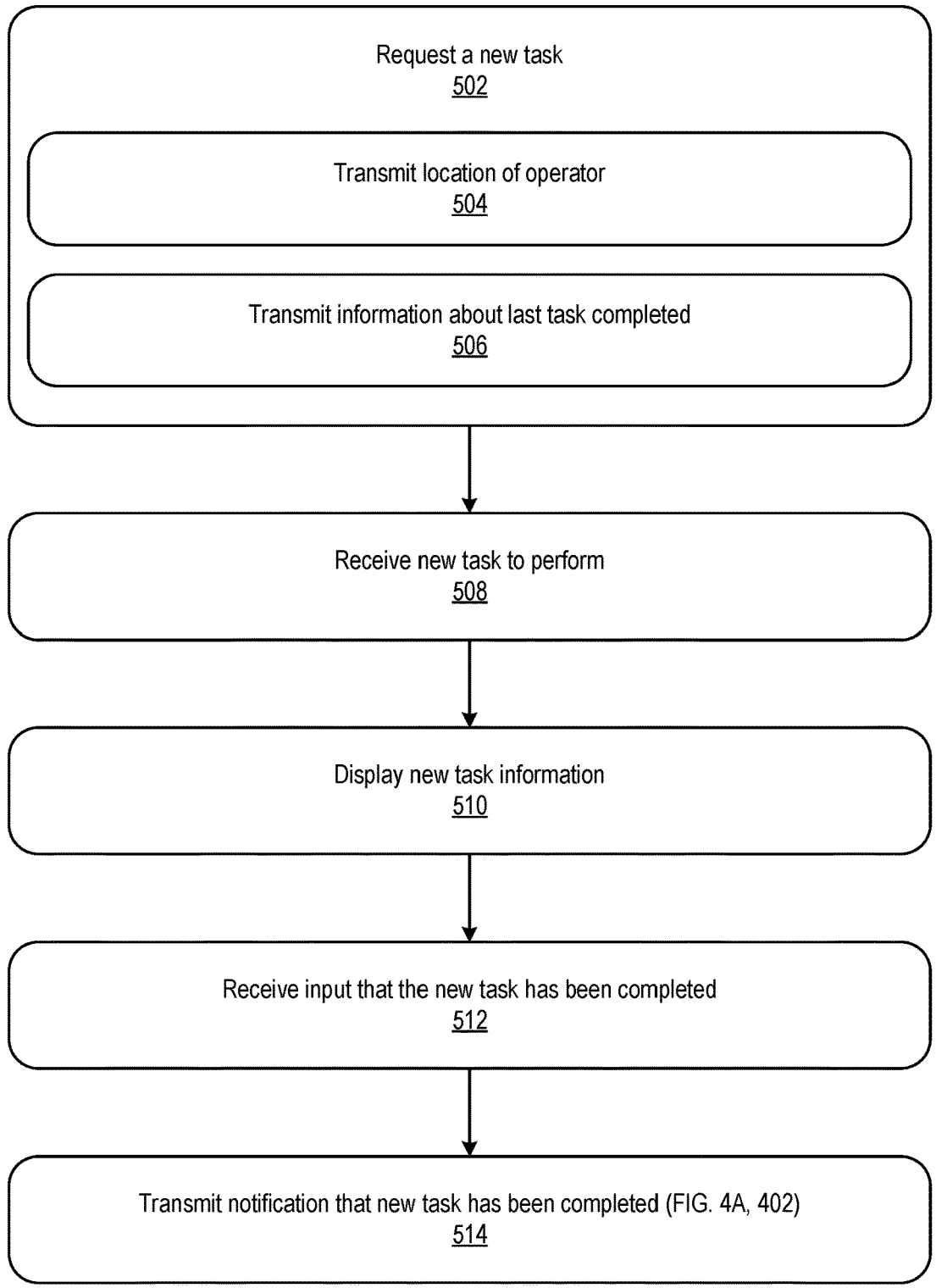
FIG. 5 is a flowchart of a process for assigning a warehouse operator a next task to complete.

Still referring to the process 400 in FIGS. 4A-E, the computer system can determine whether the operator requested a task in 460 (e.g., refer to FIG. 5). The operator can have a user device, such as a laptop, computer, mobile device, smartphone, or other computing device. The operator can provide input to the user device indicating that the operator has completed a task and is ready to execute another, new task.

If the operator requested a task, then the computer system can send the operator a highest task in the operator's queue in 462. The highest task in the operator's queue can be an initially assigned task, a swapped task, and/or a task having a modified destination location and/or source location, based on the computer system performing the blocks 402-458 up to the point that the request for the task is received in 460.

Once the highest task is sent to the operator, the computer system can mark the task as in progress in 464. A task that is marked as in progress is one that may not be used in subsequent swap determinations. After all, the computer system cannot swap a task that is currently being performed with another task because doing so can cause inefficiencies and delays in the warehouse. Instead, the computer system can proceed with making swap determinations and/or task modifications that involve a second highest ranked task in the operator's queue (which may now become the highest ranked task in the operator's queue once the highest task that was sent to the operator was marked as in progress).

After marking the highest task as in progress, the computer system can determine whether another truck has arrived at the warehouse in 466. Moreover, if the operator did not request a task, then the computer system can determine whether another truck has arrived at the warehouse in 466. The computer system can be in communication with a warehouse management system (WMS) that can receive updates about inbound and outbound trucks at the warehouse. Thus, the WMS can receive notification of the arrival of the truck. The WMS can then transmit the notification to the computer system.

If another truck arrived at the warehouse, then a current state of the warehouse has changed. Since the current state of the warehouse has changed, one or more additional tasks may need to be executed that involve the truck that just arrived. In some implementations, the one or more additional tasks can be higher priority than one or more tasks that have initially been assigned to the operators' queues. For example, the truck can include pallets that require immediate cold storage while the initially assigned tasks may not have any storage limitations or conditions.

As a result, when the truck has arrived, the computer system can return to block 402 and perform blocks 402-464. The computer system may generate new or updated tasks queues for each of the operators and perform swap and/or modification determinations for one or more of the operators' queues of tasks. The computer system can perform the blocks 402-464 in order to determine optimal task selection for each of the operators that can result in an improved global efficiency metric.

If another truck has not yet arrived, the computer system can return to block 414. Since there has not been a change of state of the warehouse, the computer system may not need to generate new or updated queues of tasks for each of the operators. Instead, the computer system can continue with performing swap and/or modification determinations using the current queues of tasks, as represented by blocks 414-464.

Referring to the process 400 in FIGS. 4A-E, the computer system can retrieve additional information from one or more data stores that can be used to assess task swaps and/or modifications. For example, the computer system can retrieve the queue of tasks assigned to each operator using an operator identifier. The queue can include, for each task, a task reference or identifier, a task type (e.g., put-away, staging, replenishment, etc.), a task creation time, a task status (e.g., in progress, not yet assigned, etc.), a task target completion time, a location name of a pallet associated with the task (e.g., or a set of locations for feasible substitution pallets for outbound tasks), location coordinates for the pallet associated with the task, a set of mechanical equipment that can be used to execute the task, a set of IT equipment that can be used to execute the task, a flag indication of whether the pallet is on a top or bottom of a double stack, whether the pallet is a double pallet, a location name for the pallet destination (e.g., or a set of locations; can include put-away, stage, dock door, dock lane, drop, replenishment, reverse replenishment, full pallet, moves, relocation, etc.), location coordinates for the pallet destination (e.g., which can be calculated based on the location name), and/or a confirmation number for an inbound or outbound truck that corresponds to the task.

In some implementations, the computer system may also retrieve and use information about items on the pallet, such as owner identifier, item identifier, item description, item identifier data, item group, case quantity on the pallet, height, dimensions, case height, gross case weight, temperature zone, pallet platform type, and velocity. The computer system may also retrieve information about one or more trucks with known appointment times referenced in the queue of tasks. The truck information can be dynamically updated whenever a new appointment is made or a new truck arrives at the warehouse. The truck information can include truck confirmation number, appointment time, arrival time of the truck that generated the task (e.g., which can be blank if the truck has not yet arrived), target time of the truck that generated the task (e.g., which can be a time at which the truck must be finished unloading/loading, such as 2 hours after truck arrival), a door to which the truck is assigned (e.g., which can be updated to an actual location of the truck once the truck arrives at the warehouse), a set of dock lanes used for this truck (e.g., which can be empty until a door number and lane number of the truck is known), a number of pallets complete (e.g., for inbound cases, the pallets are already unloaded from the truck, and for outbound cases, the pallets are already loaded into the truck), and an estimate of a total number of pallets in the truck.

The computer system can also access inventory information for all locations in the warehouse, which can be used to determine optimal task swaps and/or modifications. The inventory information can be updated whenever there is a change at any location name in the warehouse (e.g., a pallet is stored at a particular location, a pallet is pulled from a particular location, a truck arrives at a dock door, etc.). The inventory information can include location name, coordinates, temperature zone, velocity percentile, maximum height, maximum weight, capacity (e.g., maximum number of pallets), type (e.g., storage last-in-first-out, storage first-in-first-out, pick zone, staging, mole rack, etc.), and a set of pallets currently in the location. The set of pallets can include additional information such as depth in the location, owner code, item identifier (e.g., code, barcode, label, SKU, QR code), and identifier data.

In some implementations, the computer system can retrieve information about each of the operators that are currently signed in to execute tasks. The operator information can be updated whenever an operator signs in or out.

The operator information can also be updated whenever a task assignment is swapped or otherwise modified. The operator information can include an operator identifier, the operator's current group assignment (e.g., dock, full movement, case pick, etc.), task types that the operator is trained to perform, mechanical equipment that the operator is using, IT equipment that the operator is using, a last known location name of the operator (e.g., current location), last known coordinates of the operator, and a task reference number that the operator is currently executing or has completed executing.

Moreover to project empty travel time per operator, the computer system can retrieve warehouse configuration information. The configuration information can include a directed graph network that describes a map of the warehouse. Nodes of the directed graph network can represent input and output locations and grid locations throughout the warehouse. The nodes can also have centered coordinates. Directed edges between the nodes can be used to represent feasible paths between the nodes. The paths may be used by the operator in completing any of the tasks in the operator's queue. The computer system can use one or more additional or fewer pieces of information in order to determine optimal task swaps and/or modifications that improve or otherwise maintain the global efficiency metric for the warehouse.

In some implementations, the computer system can perform the swapping of tasks (block 414), the modifying of a task to use a different destination location (block 426), and the modifying of a task to use a different source pallet (block 444) in a different order. For example, the computer system may change the queues of one or more operators by randomly performing any of the blocks 414, 426, and 444, such that multiple swaps (block 414) may be performed, then a source pallet can be changed (block 444), and then two destination locations can be changed (block 426). In some implementations, a single change can include both swapping tasks (block 414) and/or changing destination locations (block 426) and/or changing source pallets (block 444), such that a task may be both swapped and its origin and/or destination swapped.

FIG. 5 is a flowchart of a process 500 for assigning a warehouse operator a next task to complete. The process 500 can be performed when the operator requests a task in block 460 in the process 400 depicted in FIGS. 4A-E. The process 500 can be performed by a user computing device of the operator, such as a mobile phone, laptop, tablet, or computer. The process 500 can also be performed by another computing device, computer system, network of computing devices, and/or servers. For example, one or more blocks of the process 500 can be performed by the computer system 114. In some implementations, one or more blocks of the process 500 can be performed by a warehouse management system (WMS). For illustrative purposes, the process 500 is described from a perspective of an operator user device.

Referring to the process 500, the operator user device can request a new task in 502. As described herein, a new task can be requested once the operator completes a current task. In some implementations, a new task can be requested once the operator is about to complete the current task. As a result, any time lag between transmitting the request and receiving the new task can be filled with the operator completing the current task. This means that the operator may not experience downtime between tasks, which can be advantageous to improve overall efficiency of the operator.

In some implementations, the operator can provide input to the operator user device that indicates the new task is being requested. In some implementations, the operator user device can automatically request the new task without human intervention. For example, the operator user device can track movement of the operator in the warehouse. Once the operator user device determines that the operator is at a destination location of the current task, the operator user device can determine that the operator has completed or is about to complete the current task. Accordingly, the operator user device can automatically request the new task. Automatic requests for new tasks can also be advantageous to reduce an amount of empty time that the operator can spend manually requesting the new tasks. As a result, overall efficiency of the operator can be improved.

As part of requesting the new task, the operator user device can transmit location information of the operator in 504. The operator user device can also transmit information about a last task that was completed in 506. The request for the new task can include additional input data that can be used by the computer system 114 to determine what new task to assign to the operator. For example, the request can include a facility code identifying what warehouse the operator is working in. The request can also include an identifier code for the operator, which can be used by the computer system 114 to identify the operator's queue of tasks and determine which task to assign next.

The operator user device can determine the current location of the operator using triangulation techniques and/or one or more location presence signals that are received from location sensing devices placed throughout the warehouse. In some implementations, the operator can manually input their current location to the operator user device. In yet some implementations, when the operator user device cannot determine, in real-time, the current location of the operator, the operator user device can retrieve the destination location of the last task (e.g., from a data store) and identify that location as the operator's current location.

The information about the last task completed can include how long it took the operator to complete, how much empty time the operator experienced between the last task and a task prior to the last task. The information can also include the destination location of the last task. One or more additional or fewer information about the last task can be transmitted in 506.

As described herein, the request along with the location and last task information can be transmitted to the computer system 114. The computer system 114 can use this information to determine what new task to assign to the operator that will improve or otherwise maintain an efficiency metric of the operator as well as the global efficiency metric of the warehouse (e.g., refer to FIGS. 1-4).

Once the computer system 114 determines what new task can be assigned to the operator, the operator user device can receive the new task to perform in 508. In other words, the computer system 114 can send first instructions to cause a first moving machine (e.g., the operator) to perform a next-to-perform task from a first queue of item-movement tasks. The first queue can be assigned to the first moving machine, where each moving machine can be assigned their own queue. The next-to-perform task can be a highest-ranked task in the first queue. For example, the next-to-perform task can be an initially assigned task for the operator, a swapped task, a task with a modified destination, or a task with a modified source pallet.

The operator user device can display new task information in 510. For example, the operator user device can include a display screen having a graphical user interface (GUI) display. The operator can provide input using the GUI display. The operator can also view output via the GUI display. The new task information can include a warehouse identifier, the operator's identifier, a set of task reference or identifier numbers (e.g., which can contain multiple values where the task involves a double stacked pallet), a set of locations for the pallet (e.g., which can contain multiple values where the task involves a double stacked pallet), and a target location to which the pallet needs to be transported. The new task information can further include instructions that direct the operator from the operator's current location to a destination location or end location of the task. The instructions can include directions that guide the operator through the warehouse. The instructions can also be step-by-step instructions about what pallet the operator must pick up and/or how the operator can arrange the pallet in its destination location. The new task information can also include an amount of time that the operator is expected to take to complete the task, a penalty if the operator exceeds the expected time, and an expected amount of empty time that the operator will experience between tasks.

Using the displayed information, the operator can proceed to perform the new task. In some implementations, the operator user device can transmit a notification to the computer system 114 indicating that the operator is currently performing the new task. Thus, as described in reference to the process 400 in FIGS. 4A-E, the computer system 114 can mark the new task as in progress (e.g., refer to block 464 in FIG. 4E).

The operator user device can receive input indicating that the new task has been completed in 512. For example, once the operator puts a pallet associated with the new task into its designated storage location, the operator can be done with the new task. The operator can provide input to the operator user device that indicates the new task is done.

Accordingly, the operator user device can transmit a notification to the computer system 114 that the new task has been completed in 514. Once the computer system 114 receives this notification, the computer system 114 can perform the process 400 in FIGS. 4A-E by generating updated queues of tasks and assessing new swaps and/or modifications of tasks across queues and/or within the same queue.

Moreover, the process 500 can be repeated every time that the operator completes a current or new task and/or requests a new task. Thus, after the operator user device transmits the notification that the new task has been completed in 514, the operator user device can return to block 502 and repeat blocks 502-514. The blocks 502-514 can be repeated for as long as the operator associated with the operator user device is signed in to be working in the warehouse. Additionally, the process 500 can be performed by each operator user device of each operator that is signed in to be working in the warehouse. In some implementations, a centralized computer system, such as a WMS, can perform the process 500 for each of the operators that are signed in to be working in the warehouse.

The techniques described throughout this disclosure can be used in a variety of settings or applications in a warehouse environment or similar storage facility. As mentioned, assessment of task swaps and/or modifications can be performed for tasks that involve moving items from a truck to a dock area and vice versa, full pallet moves throughout the warehouse, case picking, assembly of mixed pallets and storage of such pallets, automatic conveyor lanes, and automatic dock lanes.

For example, tasks in dock queues can include unloading, receiving, and loading. Unloading can include moving a pallet from a truck to a dock lane. Receiving can include capturing data on the pallet in the dock lane. Loading can include moving the pallet from a dock lane into a truck. The techniques described herein can be executed once an operator is available to execute a new task in the dock area. The operator can become available when the operator finished a task in the dock area, switched task groups to dock tasks, or otherwise can perform dock tasks in addition to or in lieu of other tasks in the warehouse. Once a request for a new dock task is received by a computer system (e.g., the computer system 114), the computer system can retrieve information about queues of dock tasks that can be used to determine what new task to assign to the operator. The received information can include information previously described throughout this disclosure as well as task type (e.g., loading, receiving, unloading, etc.), current location name of a pallet associated with the task (e.g., dock door, dock lane, etc.), and a target location name of the pallet (e.g., dock door, dock lane, a location inside a freezer, truck, etc.). The computer system can also retrieve information about trucks that are references in the queues. The truck information can include information previously described throughout this disclosure as well as a door to which the truck is assigned and a set of dock lanes used for the truck. Moreover, the computer system can retrieve location information about all locations in the dock area, including dock lanes and dock doors. The location information can include location name, coordinates, and set of pallets in that location. As described above, the computer system can also retrieve information about all operators that are currently signed in to execute tasks in the warehouse, regardless of whether they are assigned dock tasks or other tasks. In addition to the operator information described above, the computer system can also retrieve information about a task that the operator is currently performing, which can include a source location name (e.g., location at which the pallet was at a beginning of executing the task), source location coordinates, target location name (e.g., an end destination location to which the pallet is transported), and target location coordinates. Finally, the computer system can generate output after assessing task swaps and/or modifications that includes a target location name for a next dock task to execute. The target location can be a dock door, dock lane, truck, or other location in the dock area. The output can also provide instructions on how to complete the next dock task.

As another example, the disclosed techniques can be used for selecting tasks in the dock area of an automated warehouse. The disclosed techniques can be used in hybrid warehouses that are between fully automated warehouses with conveyor lanes and manual warehouses with dock lanes. The automated dock tasks can include inbound to an infeed conveyor belt, inbound to a dock lane, reworking at a platform, reworking from a platform for a fix pallet, receiving on a dock lane, moving a pallet to a slat area, moving a pallet into a freezer unit, moving a pallet out of a freezer unit, de-slatting a pallet, re-ingesting a pallet, outbound staging, and outbound loading. The computer system can retrieve information about queues of automated dock tasks. In addition to the information previously described, the information for each of the automated dock tasks can further include a current location name of a pallet for each task (e.g., door, conveyor, dock lane, freezer unit, truck, etc.), a set of mechanical equipment that can be used to execute the task, a set of IT equipment that can be used to execute the task, and a set of target locations to which a pallet needs to be automatically moved to. The computer system can also retrieve information about all locations in the dock area, which can include all dock doors (e.g., trucks), dock lanes, conveyor positions on an inbound section of the conveyor belts (e.g., before T-car, conveyor loop, RGV loop, etc.), conveyor positions on an inbound section of the conveyor belts (e.g., after T-car, conveyor loop, RGV loop, etc.), floor locations identified for slatting, and locations in freezer units. Each of these locations can include additional data, such as location type, capacity (e.g., maximum number of pallets), set of pallets currently in the location, and data associated with each of the set of pallets. The data associated with each pallet can include a location, associated truck or order number, classification of an outbound pallet, and depth in the location (e.g., for multi-deep locations). Moreover, the computer system can retrieve configuration information associated with the warehouse, which can include all locations in the warehouse. This can include all conveyor locations and edges between neighboring automation locations. Length and capacity data associated with each edge can also be included in the configuration information. The location and capacity data can be used, for example, by the computer system to determine empty travel time between tasks and projected task completion times.

Similarly, the disclosed techniques can be used for selecting tasks in automated warehouses with conveyor lanes. Automated conveyor tasks can pertain to staging pallets on outbound conveyor belts or lanes. The automated conveyor tasks can include inbound to infeed conveyor belts, outbound loading of pallets from conveyor lanes into trucks, reworking pallets at a platform, reworking from platforms to fix pallets, inbound to dock lanes, inbound to freezer units, receiving pallets on a dock lane, receiving pallets from a freezer unit, moving pallets to a slat area, moving pallets into a freezer unit or tempering, moving pallets out of a freezer unit or tempering, deslatting, and re-ingesting pallets. The computer system can retrieve same or similar information as described above in order to assess automated conveyor task swaps and/or modifications.

As yet another example, tasks in case picking can include picking items that can be used to build mixed pallets and storing the mixed pallets. Thus, a case picking task may not be completed until the operator puts away the built mixed pallet in a storage location. The storage location, in some implementations, can be close to dock lanes and can be easily accessible for staging the pallet in the dock area when an outbound truck arrives. Assessment of case picking task swaps and/or modifications can be performed by the computer system once the operator finishes building a case pick pallet (e.g., including storing the case pick pallet), the operator switches task groups to building case pick pallets, or the operator is otherwise able to perform case picking tasks. The computer system can retrieve information about the queues of case picking tasks. In addition to the tasks information described above, the case picking tasks information can also include a truck or order number associated with the particular case picking and data on a set of build steps for each case picking task. Each build step can include data such as a location from which the operator needs to pick items, a location name of the pallet that the operator will pick from, a build order for the pallet, and a number of cases to pick.

Figure 6:
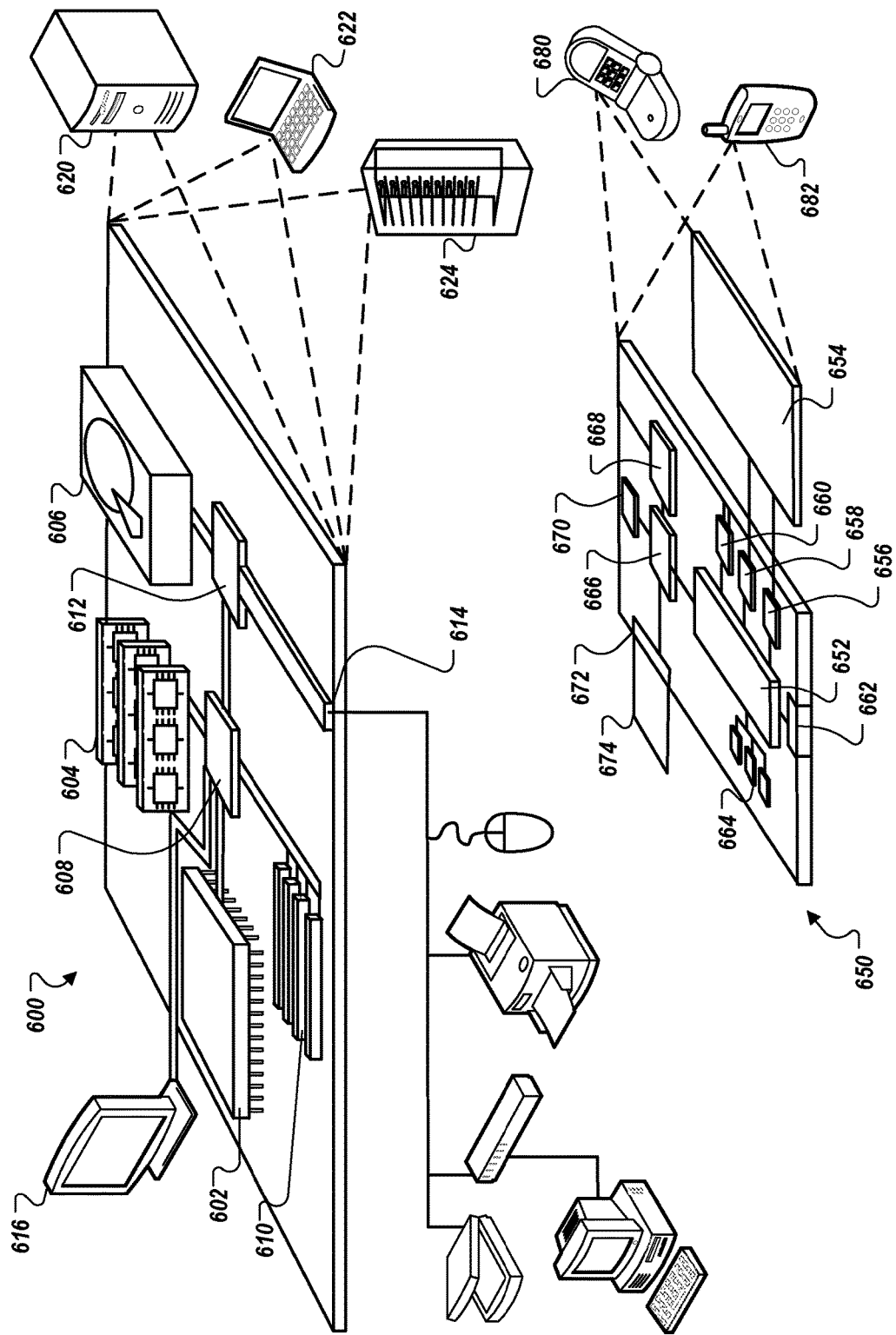
FIG. 6 is a schematic diagram that shows an example of a computing device and a mobile computing device that can be used to perform the techniques described herein.

FIG. 6 is a schematic diagram that shows an example of a computing device 600 and a mobile computing device that can be used to perform the techniques described herein. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and can be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 can also be another form of computer-readable medium, such as a magnetic or optical disk.

The storage device 606 is capable of providing mass storage for the computing device 600. In some implementations, the storage device 606 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is exemplary only. In some implementations, the high-speed interface 608 is coupled to the memory 604, the display 616 (e.g., through a graphics processor or accelerator), and to the high-speed expansion ports 610, which can accept various expansion cards (not shown). In the implementation, the low-speed interface 612 is coupled to the storage device 606 and the low-speed expansion port 614. The low-speed expansion port 614, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 600 can be implemented in a number of different forms, as shown in the figure. For example, it can be implemented as a standard server 620, or multiple times in a group of such servers. In addition, it can be implemented in a personal computer such as a laptop computer 622. It can also be implemented as part of a rack server system 624. Alternatively, components from the computing device 600 can be combined with other components in a mobile device (not shown), such as a mobile computing device 650. Each of such devices can contain one or more of the computing device 600 and the mobile computing device 650, and an entire system can be made up of multiple computing devices communicating with each other.

The mobile computing device 650 includes a processor 652, a memory 664, an input/output device such as a display 654, a communication interface 666, and a transceiver 668, among other components. The mobile computing device 650 can also be provided with a storage device, such as a micro-drive or other device, to provide additional storage. Each of the processor 652, the memory 664, the display 654, the communication interface 666, and the transceiver 668, are interconnected using various buses, and several of the components can be mounted on a common motherboard or in other manners as appropriate.

The processor 652 can execute instructions within the mobile computing device 650, including instructions stored in the memory 664. The processor 652 can be implemented as a chipset of chips that include separate and multiple analog and digital processors. The processor 652 can provide, for example, for coordination of the other components of the mobile computing device 650, such as control of user interfaces, applications run by the mobile computing device 650, and wireless communication by the mobile computing device 650.

The processor 652 can communicate with a user through a control interface 658 and a display interface 656 coupled to the display 654. The display 654 can be, for example, a TFT (Thin-Film-Transistor Liquid Crystal Display) display or an OLED (Organic Light Emitting Diode) display, or other appropriate display technology. The display interface 656 can comprise appropriate circuitry for driving the display 654 to present graphical and other information to a user. The control interface 658 can receive commands from a user and convert them for submission to the processor 652. In addition, an external interface 662 can provide communication with the processor 652, so as to enable near area communication of the mobile computing device 650 with other devices. The external interface 662 can provide, for example, for wired communication in some implementations, or for wireless communication in other implementations, and multiple interfaces can also be used.

The memory 664 stores information within the mobile computing device 650. The memory 664 can be implemented as one or more of a computer-readable medium or media, a volatile memory unit or units, or a non-volatile memory unit or units. An expansion memory 674 can also be provided and connected to the mobile computing device 650 through an expansion interface 672, which can include, for example, a SIMM (Single In Line Memory Module) card interface. The expansion memory 674 can provide extra storage space for the mobile computing device 650, or can also store applications or other information for the mobile computing device 650. Specifically, the expansion memory 674 can include instructions to carry out or supplement the processes described above, and can include secure information also. Thus, for example, the expansion memory 674 can be provide as a security module for the mobile computing device 650, and can be programmed with instructions that permit secure use of the mobile computing device 650. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 664, the expansion memory 674, or memory on the processor 652. In some implementations, the computer program product can be received in a propagated signal, for example, over the transceiver 668 or the external interface 662.

The mobile computing device 650 can communicate wirelessly through the communication interface 666, which can include digital signal processing circuitry where necessary. The communication interface 666 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 668 using a radio-frequency. In addition, short-range communication can occur, such as using a Bluetooth, WiFi, or other such transceiver (not shown). In addition, a GPS (Global Positioning System) receiver module 670 can provide additional navigation- and location-related wireless data to the mobile computing device 650, which can be used as appropriate by applications running on the mobile computing device 650.

The mobile computing device 650 can also communicate audibly using an audio codec 660, which can receive spoken information from a user and convert it to usable digital information. The audio codec 660 can likewise generate audible sound for a user, such as through a speaker, e.g., in a handset of the mobile computing device 650. Such sound can include sound from voice telephone calls, can include recorded sound (e.g., voice messages, music files, etc.) and can also include sound generated by applications operating on the mobile computing device 650.

The mobile computing device 650 can be implemented in a number of different forms, as shown in the figure. For example, it can be implemented as a cellular telephone 680. It can also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A computer-implemented method for ordering tasks to move items using multiple automated moving machines in a storage facility that improves overall efficiencies of the storage facility, the method comprising:
    identifying, by a computer system, a collection of item-movement tasks to perform in a storage facility using multiple automated moving machines, each item-movement task in the collection of item-movement tasks indicating an empty travel time metric descriptive of automatic movement of a respective item from a respective source location to a respective destination location by the multiple automated moving machines, wherein the multiple automated moving machines each comprise processors that are configured to execute instructions to (i) receive information about performing one or more of the collection of item-movement tasks and (ii) cause the respective multiple automated moving machine to execute the one or more of the collection of item-movement tasks based on the received information;
    generating, by the computer system, a distribution of item-movement tasks in the collection of item-movement tasks among multiple queues of item-movement tasks that correspond to the multiple automated moving machines, to form a first state of the multiple queues of item-movement tasks, wherein each automated moving machine of the multiple automated moving machines is assigned a respective queue of item-movement tasks to perform, wherein the multiple automated moving machines comprises:
        a first automated moving machine assigned to a first queue of item-movement tasks from among the multiple queues of item-movement tasks, and
        a second automated moving machine assigned to a second queue of item-movement tasks from among the multiple queues of item-movement tasks;
    determining, by the computer system, a first efficiency value that indicates a first total empty travel time of the multiple automated moving machines based on the multiple automated moving machines performing the multiple queues of item-movement tasks while the multiple queues of item-movement tasks have the first state;
    identifying, by the computer system, a first item-movement task from the first queue of item-movement tasks and a second item-movement task from the second queue of item-movement tasks that are swappable based on the first item-movement task and second item-movement task being ready for execution;
    (i) swapping, by the computer system, the first item-movement task from the first queue of item-movement tasks with the second item-movement task from the second queue of item-movement tasks, to form a second state of the multiple queues of item-movement tasks, wherein:
        the first queue of item-movement tasks to be performed by the first automated moving machine no longer includes the first item-movement task and now includes the second item-movement task, and
        the second queue of item-movement tasks to be performed by the second automated moving machine no longer includes the second item-movement task and now includes the first item-movement task;

(ii) determining, by the computer system, a second efficiency value that indicates a second total empty travel time of the multiple automated moving machines based on simulating the multiple automated moving machines performing the multiple queues of item-movement tasks while the multiple queues of item-movement tasks have the second state, wherein in the second state the first automated moving machine performs the first queue of item-movement tasks with the second item-movement task and the second automated moving machine performs the second queue of item-movement tasks with the first item-movement task;

(iii) determining, by the computer system and based on comparison of the first efficiency value to the second efficiency value, whether total empty travel time of the multiple automated moving machines is reduced when the multiple queues of item-movement tasks have the first state; and (iv) swapping, by the computer system and based on determining that total empty travel time of the multiple automated moving machines is reduced when the multiple queues of item-movement tasks have the first state, the first item-movement task in the second queue of item-movement tasks with the second item-movement task in the first queue of item-movement tasks, to revert the multiple queues of item-movement tasks to the first state;

generating, by the computer system, operating tasks based on the multiple queues of item-movement tasks in the first state, wherein the operating tasks are generated for the first state to reduce empty travel time for the multiple automated moving machines and increase overall efficiencies in the storage facility;

generating, by at least one of the multiple automated moving machines, automatically and without human intervention, an automated request for a task;

receiving, by the computer system, from the at least one of the multiple automated moving machines, the automated request for the task;

identifying, by the computer system and based on the received automated request, at least one of the generated operating tasks;

transmitting, by the computer system, the identified operating tasks to at least one of the multiple automated moving machines in response to receiving the automated request for the task from the at least one of the multiple automated moving machines, wherein the identified operating task is descriptive of an identified item, an identified source location, and an identified destination location;

receiving, by at least one of the multiple automated moving machines, the transmitted operating tasks; and moving, by at least one of the multiple automated moving machines, the identified item from the identified source location to the identified destination location based on the received operating tasks, wherein (i)-(iv) are repeated for different pairs of item-movement tasks from the first queue and the second queue until a determination that total empty travel time of the multiple automated moving machines is reduced when the multiple queues of item-movement tasks have the second state, at which point the queues of item-movement tasks are kept in the second state.

2. The computer-implemented method of claim 1, wherein the method further comprises leaving the multiple queues of item-movement tasks in the second state as a result of determining, based on comparison of the first efficiency value to the second efficiency value, that total empty travel time of the multiple automated moving machines is reduced when the multiple queues of item-movement tasks have the second state.

3. The computer-implemented method of claim 1, further comprising:
sending first instructions to cause the first automated moving machine to perform a next-to-perform task from the first queue of item-movement tasks; and
sending second instructions to cause the second automated moving machine to perform a next-to-perform task from the second queue of item-movement tasks.

4. The computer-implemented method of claim 1, further comprising randomly selecting the first item-movement task and the second item-movement task for the swapping of the first item-movement task and the second item-movement task, among item-movement tasks in the multiple queues of item-movement tasks.

5. The computer-implemented method of claim 1, wherein:
each item-movement task in the collection of item-movement tasks indicates movement of a respective pallet from a respective source location to a respective destination location; and
at least some of the multiple automated moving machines are lift trucks.

6. The computer-implemented method of claim 1, wherein generating the distribution of item-movement tasks in the collection of item-movement tasks among the multiple queues of item-movement tasks includes randomly distributing item-movement tasks in the collection of item-movement tasks among the multiple queues of item-movement tasks.

7. The computer-implemented method of claim 1, wherein:
the first efficiency value that indicates the first empty travel time of the multiple automated moving machines indicates a first amount of time that the multiple automated moving machines are without an item to move during performance of the multiple queues of item-movement tasks while the multiple queues of item-movement tasks have the first state; and
the second efficiency value that indicates the second empty travel time of the multiple automated moving machines indicates a second amount of time that the multiple automated moving machines are without an item to move during performance of the multiple queues of item-movement tasks while the multiple queues of item-movement tasks have the second state.

8. The computer-implemented method of claim 1, further comprising:
determining a third efficiency value that indicates a third empty travel time of the multiple automated moving machines based on the multiple automated moving machines performing the multiple queues of item-movement tasks while the multiple queues of item-movement tasks have a third state;
modifying a third item-movement task from the first queue of item-movement tasks while the multiple queues of item-movement tasks have the third state (i) from having an original destination location at which to place an item to be moved by the third-item-movement task (ii) to having an alternative destination location at which to place the item to be moved by the third item-movement task, to form a fourth state of the multiple queues of item-movement tasks;
determining a fourth efficiency value that indicates a fourth empty travel time of the multiple automated moving machines based on the multiple automated moving machines performing the multiple queues of item-movement tasks while the multiple queues of item-movement tasks have the fourth state;
determining, based on comparison of the third efficiency value to the fourth efficiency value, that empty travel time of the multiple automated moving machines is reduced when the multiple queues of item-movement tasks have the third state; and
modifying, based on having determined that the empty travel time of the multiple automated moving machines is reduced when the multiple queues of item-movement tasks have the third state, the third item-movement task to have the original destination location, to revert the multiple queues of item-movement tasks to the third state.

9. The computer-implemented method of claim 8, further comprising leaving the multiple queues of item-movement tasks in the fourth state as a result of determining, based on comparison of the third efficiency value to the fourth efficiency value, that empty travel time of the multiple automated moving machines is reduced when the multiple queues of item-movement tasks have the fourth state.

10. The computer-implemented method of claim 1, further comprising:
determining a third efficiency value that indicates a third total empty travel time of the multiple automated moving machines based on the multiple automated moving machines performing the multiple queues of item-movement tasks while the multiple queues of item-movement tasks have a third state;
modifying a third item-movement task from the first queue of item-movement tasks while the multiple queues of item-movement tasks have the third state (i) from selecting an original item from an original source location (ii) to selecting an alternative item from an alternative location to form a fourth state of the multiple queues of item-movement tasks, the alternative item being a same type of item as the original item;
determining a fourth efficiency value that indicates a fourth total empty travel time of the multiple automated moving machines based on the multiple automated moving machines performing the multiple queues of item-movement tasks while the multiple queues of item-movement tasks have the fourth state;
determining, based on comparison of the third efficiency value to the fourth efficiency value, that total empty travel time of the multiple automated moving machines is greater when the multiple queues of item-movement tasks have the third state; and
modifying, based on having determined that the total empty travel time of the multiple automated moving machines is reduced when the multiple queues of item-movement tasks have the third state, the third item-movement task to select the original item from the original source location, to revert the multiple queues of item-movement tasks to the third state.

11. A warehouse management system, comprising:
a computer system comprising one or more processors;
multiple automated moving machines each configured to communicate with the computer system, wherein the multiple automated moving machines comprises:
a first automated moving machine comprising one or more processors and assigned to a first queue of item-movement tasks from among the multiple queues of item-movement tasks, and
a second automated moving machine comprising one or more processors and assigned to a second queue of item-movement tasks from among the multiple queues of item-movement tasks; and
one or more computer-readable devices including instructions that, when executed by the one or more processors, cause the warehouse management system to perform operations that include:
identifying a collection of item-movement tasks to perform in a storage facility using the multiple automated moving machines, each item-movement task in the collection of item-movement tasks indicating an empty travel time metric descriptive of automatic movement of a respective item from a respective source location to a respective destination location by the multiple automated moving machines, wherein the multiple automated moving machines each comprise processors that are configured to execute instructions to (i) receive information about performing one or more of the collection of item-movement tasks and (ii) cause the respective multiple automated moving machine to execute the one or more of the collection of item-movement tasks based on the received information;
generating a distribution of item-movement tasks in the collection of item-movement tasks among multiple queues of item-movement tasks that correspond to the multiple automated moving machines, to form a first state of the multiple queues of item-movement tasks, wherein each automated moving machine of the multiple automated moving machines is assigned a respective queue of item-movement tasks to perform;
determining a first efficiency value that indicates a first total empty travel time of the multiple automated moving machines based on the multiple automated moving machines performing the multiple queues of item-movement tasks while the multiple queues of item-movement tasks have the first state;
identifying a first item-movement task from the first queue of item-movement tasks and a second item-movement task from the second queue of item-movement tasks that are swappable based on the first item-movement task and second item-movement task being ready for execution;
(i) swapping the first item-movement task from the first queue of item-movement tasks with the second item-movement task from the second queue of item-movement tasks, to form a second state of the multiple queues of item-movement tasks, wherein:
the first queue of item-movement tasks to be performed by the first automated moving machine no longer includes the first item-movement task and now includes the second item-movement task, and
the second queue of item-movement tasks to be performed by the second automated moving machine no longer includes the second item-movement task and now includes the first item-movement task;
(ii) determining a second efficiency value that indicates a second total empty travel time of the multiple automated moving machines based on simulating the multiple automated moving machines performing the multiple queues of item-movement tasks while the multiple queues of item-movement tasks have the second state, wherein in the second state the first automated moving machine performs the first queue of item-movement tasks with the second item-movement task and the second automated moving machine performs the second queue of item-movement tasks with the first item-movement task;

(iii) determining, based on comparison of the first efficiency value to the second efficiency value, whether total empty travel time of the multiple automated moving machines is reduced when the multiple queues of item-movement tasks have the first state; and (iv) swapping, based on determining that the total empty travel time of the multiple automated moving machines is reduced when the multiple queues of item-movement tasks have the first state, the first item-movement task in the second queue of item-movement tasks with the second item-movement task in the first queue of item-movement tasks, to revert the multiple queues of item-movement tasks to the first state;

generating operating tasks based on the multiple queues of item-movement tasks in the first state, wherein the operating tasks are generated for the first state to reduce empty travel time for the multiple automated moving machines and increase overall efficiencies in the storage facility;

generating, by at least one of the multiple automated moving machines, automatically and without human intervention, an automated request for a task;

receiving, by the computer system, from the at least one of the multiple automated moving machines, the automated request for the task;

identifying, by the computer system and based on the received automated request, at least one of the generated operating tasks;

transmitting, by the computer system, the identified operating tasks to at least one of the multiple automated moving machines in response to receiving the automated request for the task from the at least one of the multiple automated moving machines, wherein the task is descriptive of an identified item, an identified source location, and an identified destination location;

receiving, by at least one of the multiple automated moving machines, the transmitted operating tasks; and moving, by at least one of the multiple automated moving machines, the identified item from the identified source location to the identified destination location based on the received operating tasks, wherein (i)-(iv) are repeated for different pairs of item-movement tasks from the first queue and the second queue until a determination that a utilization of the multiple automated moving machines is greater when the multiple queues of item-movement tasks have the second state, at which point the queues of item-movement tasks are kept in the second state.

12. The warehouse management system of claim 11, wherein the operations further include leaving the multiple queues of item-movement tasks in the second state as a result of determining, based on comparison of the first efficiency value to the second efficiency value, that total empty travel time of the multiple automated moving machines is reduced when the multiple queues of item-movement tasks have the second state.

13. The warehouse management system of claim 11, wherein the operations further include:
sending first instructions to cause the first automated moving machine to perform a next-to-perform task from the first queue of item-movement tasks; and
sending second instructions to cause the second automated moving machine to perform a next-to-perform task from the second queue of item-movement tasks.

14. The warehouse management system of claim 11, wherein the operations further include randomly selecting the first item-movement task and the second item-movement task, for the swapping of the first item-movement task and the second item-movement task, among item-movement tasks in the multiple queues of item-movement tasks.

15. The warehouse management system of claim 11, wherein:
each item-movement task in the collection of item-movement tasks indicates movement of a respective pallet from a respective source location to a respective destination location; and
at least some of the multiple automated moving machines are lift trucks.

16. The warehouse management system of claim 11, wherein generating the distribution of item-movement tasks in the collection of item-movement tasks among the multiple queues of item-movement tasks includes randomly distributing item-movement tasks in the collection of item-movement tasks among the multiple queues of item-movement tasks.

17. The warehouse management system of claim 11, wherein:
the first efficiency value that indicates the first total empty travel time of the multiple automated moving machines indicates a first amount of time that the multiple automated moving machines are without an item to move during performance of the multiple queues of item-movement tasks while the multiple queues of item-movement tasks have the first state; and
the second efficiency value that indicates utilization of the multiple automated moving machines indicates a second amount of time that the multiple automated moving machines are without an item to move during performance of the multiple queues of item-movement tasks while the multiple queues of item-movement tasks have the second state.

18. The warehouse management system of claim 11, wherein the operations further include:
determining a third efficiency value that indicates a third total empty travel time of the multiple automated moving machines based on the multiple automated moving machines performing the multiple queues of item-movement tasks while the multiple queues of item-movement tasks have a third state;
modifying a third item-movement task from the first queue of item-movement tasks while the multiple queues of item-movement tasks have the third state (i) from having an original destination location at which to place an item to be moved by the third-item-movement task (ii) to having an alternative destination location at which to place the item to be moved by the third item-movement task, to form a fourth state of the multiple queues of item-movement tasks;
determining a fourth efficiency value that indicates a fourth total empty travel time of the multiple automated moving machines based on the multiple automated moving machines performing the multiple queues of item-movement tasks while the multiple queues of item-movement tasks have the fourth state;

determining, based on comparison of the third efficiency value to the fourth efficiency value, that utilization of the multiple automated moving machines is reduced when the multiple queues of item-movement tasks have the third state; and modifying, based on having determined that total empty travel time of the multiple automated moving machines is reduced when the multiple queues of item-movement tasks have the third state, the third item-movement task to have the original destination location, to revert the multiple queues of item-movement tasks to the third state.

19. The warehouse management system of claim 18, wherein the operations further include leaving the multiple queues of item-movement tasks in the fourth state as a result of determining, based on comparison of the third efficiency value to the fourth efficiency value, that total empty travel time of the multiple automated moving machines is reduced when the multiple queues of item-movement tasks have the fourth state.

20. The warehouse management system of claim 11, wherein the operations further include:

determining a third efficiency value that indicates a third total empty travel time of the multiple automated moving machines based on the multiple automated moving machines performing the multiple queues of item-movement tasks while the multiple queues of item-movement tasks have a third state;

modifying a third item-movement task from the first queue of item-movement tasks while the multiple queues of item-movement tasks have the third state (i) from selecting an original item from an original source location (ii) to selecting an alternative item from an alternative location to form a fourth state of the multiple queues of item-movement tasks, the alternative item being a same type of item as the original item;

determining a fourth efficiency value that indicates a fourth total empty travel time of the multiple automated moving machines based on the multiple automated moving machines performing the multiple queues of item-movement tasks while the multiple queues of item-movement tasks have the fourth state;

determining, based on comparison of the third efficiency value to the fourth efficiency value, that total empty travel time of the multiple automated moving machines is reduced when the multiple queues of item-movement tasks have the third state; and modifying, based on having determined that total empty travel time of the multiple automated moving machines is reduced when the multiple queues of item-movement tasks have the third state, the third item-movement task to select the original item from the original source location, to revert the multiple queues of item-movement tasks to the third state.

* * * * *